United States Patent [19]

Yamasoe et al.

[11] Patent Number: 5,478,872
[45] Date of Patent: Dec. 26, 1995

[54] HYDROPHILIC SURFACE TREATING AQUEOUS SOLUTION, HYDROPHILIC SURFACE TREATING METHOD AND HYDROPHILIC SURFACE TREATING FILM

[75] Inventors: Katsuyoshi Yamasoe, Yotsukaido; Fujio Mikami; Hidekimi Hirasawa, both of Yokohama; Masahiko Matsukawa, Kawasaki; Kouji Mizohata, Kawabe, all of Japan

[73] Assignee: Nippon Paint Co., Ltd., Osaka, Japan

[21] Appl. No.: 239,136

[22] Filed: May 6, 1994

[30] Foreign Application Priority Data

May 7, 1993 [JP] Japan ............................. 5-131350
Oct. 6, 1993 [JP] Japan ............................. 5-250315

[51] Int. Cl.$^6$ ................... C08L 1/28; C08L 29/04; C08K 3/22; C08K 5/20
[52] U.S. Cl. .................... 524/45; 524/413; 524/514; 524/538; 524/591; 524/596; 524/598; 524/608; 524/548; 524/43; 524/503; 524/221
[58] Field of Search ........................ 523/402, 409, 523/504; 524/43, 413, 457, 458, 459, 460, 510, 514, 538, 591, 596, 598, 608, 501, 512, 542, 45, 221, 503

[56] References Cited

U.S. PATENT DOCUMENTS

| | | | |
|---|---|---|---|
| 3,062,768 | 11/1962 | Brachel et al. | 524/512 |
| 3,306,863 | 2/1967 | Leitner | 524/512 |
| 3,450,658 | 6/1969 | Morison | 428/392 |
| 4,282,054 | 8/1981 | Mattor et al. | 156/289 |
| 4,592,954 | 6/1986 | Malhotra | 428/335 |
| 4,973,359 | 11/1990 | Yamasoe | 106/14.13 |
| 5,158,622 | 10/1992 | Reichgott et al. | 148/247 |
| 5,219,900 | 6/1993 | Davies et al. | 524/501 |
| 5,262,455 | 11/1993 | Riess et al. | 524/501 |

FOREIGN PATENT DOCUMENTS

| | | | |
|---|---|---|---|
| 0007604 | 2/1980 | European Pat. Off. | 524/501 |
| 1901295 | 8/1969 | Germany | 524/512 |
| 1270335 | 4/1972 | United Kingdom | 524/512 |
| WO93/02148 | 2/1993 | WIPO . | |

OTHER PUBLICATIONS

Derwent Abstract of JP-62-068 841.
Derwent Abstract of JP-55-126 563.
Derwent Abstract of JP-3-033 195.
Derwent Abstract of JP-59-020 239.
Derwent Abstract of JP-1-108 231.
Patent Abstracts of Japan JP-62-214 985.
The English abstract of Japanese Patent Laid Open No. JP Hei. 4-316837.

*Primary Examiner*—Peter A. Szekely
*Attorney, Agent, or Firm*—Sughrue, Mion, Zinn, Macpeak & Seas

[57] ABSTRACT

It is the object of the present invention to provide a hydrophilic surface treating aqueous solution, hydrophilic surface treating method, and hydrophilic surface treating film with lasting hydrophilicity and ensuring a film having a good processability. The hydrophilic treating aqueous solution contains as main components a hydrophilic polymer having a specific molecular weight and containing a polyoxyalkylene chain of 10 wt % or more in terms of solid content, and a specific aqueous resin. This enables the formation of film with good processability and good hydrophilicity and persistency of hydrophilicity on the surface of aluminum or aluminum alloy for use in aluminum fins of a heat exchanger, as well as suppressing the generation of unpleasant odor.

9 Claims, 3 Drawing Sheets

HYDROPHILIC SURFACE TREATING AQUEOUS SOLUTION, HYDROPHILIC SURFACE TREATING METHOD AND HYDROPHILIC SURFACE TREATING FILM

BACKGROUND OF THE INVENTION

1. Field of the Invention

The present invention relates to a hydrophilic surface treating aqueous solution, hydrophilic surface treating method and hydrophilic surface treating film, and more particularly, to a hydrophilic surface treating aqueous solution, hydrophilic surface treating method and hydrophilic surface treating film, capable of forming a film having anticorrosion and hydrophilicity on aluminum material such as aluminum fins of a heat exchanger.

2. Description of the Related Arts

Aluminum and its alloys are widely utilized for heat exchangers due to their light-weight and superior processability and thermal conductivity. With the spread of air conditioning systems, the number of cooling equipment or dehumidifying/cooling/heating air-conditioners is increasing. Typically, fins made of aluminum alloy are provided on the heat exchanging sections of these air-conditioners.

During the cooling mode of the air-conditioners, in general, the moisture in the air tends to adhere to the surface of the fins in the form of condensed water. It is therefore conceivable to confer a water repellency on the fin surface. The fin surface having the water repellency properties may allow the adhesion of the condensed water onto the fins in the form of hemispheres and the presence of bridge-like water between the fins. This will disadvantageously prevent the air flow of the heat exchanger and increase the air conducting resistance. Thus, the repellent fin surface may contribute to the reduction in heat exchanging efficiency.

Aluminum and its alloys originally have a good anticorrosion. In the case where the condensed water remains on the fin surface for a long period of time, a hydration reaction or corrosion reaction are accelerated due to the formation of an oxygen concentration cell on the fin surface and to the adhesion and condensation of contamination components in air. Thus, the corrosion products which have been produced by the above reaction accumulate on the fin surface, which will impair the heat exchange ability and during the heating, drive in winter cause the exhaust of white minute powder particles from the air fan together with the warmed air.

In order to solve the above problems, it has thus become desirable in recent years to improve the hydrophilicity and anticorrosion on the fin surface.

For example, U.S. Pat. No. 4,973,359 titled "Surface Treatment Chemical and Bath for Forming Hydrophilic and Coating and Method of Surface Treating Aluminum Members" discloses a hydrophilic surface treating chemical, and so on, which contains predetermined amounts of the sodium salt and/or potassium salt of carboxymethyl cellulose, ammonium salt of carboxymethyl cellulose, and N-methylol acrylamide.

Moreover, Japanese Patent Laid-open Publication No. 4-316,837 titled "Coated Aluminum Material and Method of Manufacturing the Same" discloses a coated aluminum material consisting of (a) 100 parts by weight of aqueous organic resin and (b) 50 to 1,200 parts by weight of nonionic surfactant, and having a hydrophilic film of 0.05 to 5 µm. As the aqueous organic resin, listed are aqueous acrylic resin, polyester resin, epoxy resin, alkyd resin, and polyvinyl alcohol resin. It says that an alkylallylether-type nonionic surfactant is preferable as the nonionic surfactant.

However, the hydrophilic surface treating chemical disclosed in the above U.S. Pat. No. 4,973,359 exhibited a poor moldability of the aluminum material subjected to the above hydrophilic surface treating chemical, in a so-called precoat treatment in which the aluminum material is processed into a heat exchanger after the hydrophilic treatment of the aluminum material, irrespective of its satisfactory die friction and odor. Also, the application of a lubricant onto the treating film formed by use of the hydrophilic surface treating chemical did not fully improve the moldability. Furthermore, the repetition of the warming and immersion in flowing water resulted in the deterioration of hydrophilic surface treating film and presented insufficient persistency of the hydrophilicity.

The hydrophilic film described in Japanese Patent Laid-open Publication No. 4-316,837 provides good hydrophilicity and pressing processability in cooperation with the volatile lubricating oil. In this case, however, after the application and baking of the hydrophilic film of the gazette onto the aluminum material, the volatile lubricating oil had to be further applied and baked. In other words, double-coating is required to obtain a desired performance, which will result in poor productivity. A polyoxyalkylene surfactant is also disclosed as a nonionic surfactant, which is quite different in molecular weight and performance from the present invention.

DESCRIPTION OF THE PRESENT INVENTION

The present invention was conceived in view of the above problems, and has as its object to provide a hydrophilic surface treating aqueous solution, hydrophilic surface treating method and hydrophilic surface treating film, superior in persistency of hydrophilicity and processability of precoating treatment.

According to an aspect of the present invention, there is provided a hydrophilic surface treating aqueous solution containing as its main components (I) an aqueous polymer including a polyoxyalkylene chain of 10 wt % or more in terms of solid content and having a weight-average molecular weight of 10,000 to 2,000,000; and (II) at least one aqueous resin selected from the group of an (a) unsaturated polymerizeable monomer or unsaturated aqueous polymer including an amide group and/or hydroxyl group; (b) aqueous natural polymer or its derivatives; (c) aqueous alkyd resin; (d) aqueous maleic oil; (e) aqueous polyester resin; (f) aqueous polybutadiene resin; (g) aqueous polyamide resin; (h) aqueous epoxy resin; (i) aqueous polyurethane resin; (j) aqueous phenolic resin; (k) an aqueous amino resin; and (l) an aqueous inorganic crosslinking agent.

The present invention further provides a hydrophilic surface treating aqueous solution containing in terms of solid content 5 to 50 parts by weight of polymer (I) having a weight-average molecular weight of 10,000 to 2,000,000 and including a polyoxyalkylene chain of 10 wt % or more and 5 to 50 parts by weight of polyacrylic acid in terms of solid content, with respect to a total of 100 parts by weight of components consisting of 5 to 25 parts by weight of the sodium salt and/or potassium salt of carboxymethyl cellulose; 25 to 50 parts by weight of the ammonium salt of carboxymethyl cellulose; and 25 to 70 parts by weight of N-methylol acrylamide.

The present invention further provides a hydrophilic surface treating aqueous solution containing in terms of solid content 5 to 50 parts by weight of polymer (I) having a weight-average molecular weight of 10,000 to 2,000,000 and including a polyoxyalkylene chain of 10 wt % or more in terms of solid content, 5 to 50 parts by weight of polyacrylic acid, and 0.6 to 9 parts by weight of a zirconium compound (as Zr) (II), with respect to a total of 100 parts of components consisting of 5 to 25 parts by weight of the sodium salt and/or potassium salt of carboxymethyl cellulose; 25 to 50 parts by weight of ammonium salt of the carboxymethyl cellulose; and 25 to 70 parts by weight of N-methylol acrylamide.

According to another aspect of the present invention, there is provided a hydrophilic surface treating method, comprising the steps of: degreasing a material to be treated made of aluminum or aluminum alloy; subjecting the material to anticorrosion treatment if necessary; and treating the material by use of the hydrophilic surface treating aqueous solution(s).

According to a further aspect of the present invention, there is provided a hydrophilic surface treating film containing an aqueous polymer (I) including a polyoxyalkylene chain of 10 wt % or more in terms of solid content and having a weight-average molecular weight of 10,000 to 2,000,000; and at least one aqueous resin (II) selected from (a) to (k) described above or aqueous inorganic crosslinking agent (1).

The present invention further provides a hydrophilic surface treating film containing in terms of solid content 5 to 50 parts by weight of polymer (I) having a weight-average molecular weight of 10,000 to 2,000,000 and including a polyoxyalkylene chain of 10 wt % or more and 5 to 50 parts by weight of polyacrylic acid in terms of solid content, with respect to a total of 100 parts by weight of components consisting of 5 to 25 parts by weight of the sodium salt and/or potassium salt of carboxymethyl cellulose; 25 to 50 parts by weight of ammonium salt of carboxymethyl cellulose; and 25 to 70 parts by weight of N-methylol acrylamide.

The present invention further provides a hydrophilic surface treating aqueous solution containing in terms of solid content 5 to 50 parts by weight of polymer (I) having a weight-average molecular weight of 10,000 to 2,000,000 and including a polyoxyalkylene chain of 10 wt % or more and 5 to 50 parts by weight of polyacrylic acid, in terms of solid content, and 0.6 to 9 parts by weight of a zirconium compound (as Zr) which is an aqueous component (II), with respect to total 100 parts of components consisting of 5 to 25 parts by weight of the sodium salt and/or potassium salt of carboxymethyl cellulose; 25 to 50 parts by weight of the ammonium salt of carboxymethyl cellulose; and 25 to 70 parts by weight of N-methylol acrylamide.

The above-described hydrophilic surface treating aqueous solution is used as a surface treating liquid (surface treating bath) for aluminum and its alloy, which is obtained by diluting a thick aqueous solution of the hydrophilic surface treating aqueous solution with a proper amount of water to a concentration within a use range (preferably 1 to 50 wt %, more preferably 2 to 20 wt %). If the composition of components in the aqueous solution changes during the treating process, it is desirable to appropriately add the components to thereby maintain the initial composition.

The present invention further provides a hydrophilic surface treating film which contains an aqueous polymer of a specific molecular weight including a specified amount of polyoxyalkylene chain described above, and a specific aqueous resin. The application of this film to the aluminum or its alloy for use in the heat exchanger will result in a hydrophilic aluminum material.

The First Hydrophilic Surface Treating Aqueous Solution

An aqueous polymer containing a polyoxyalkylene chain can be, for example, polyethylene oxide (PEO), ethylene oxide/propylene oxide copolymer, and ethylene oxide/methylene oxide copolymer. The aqueous polymer contains the polyoxyakylene chain in an amount of 10 wt % or more in terms of solid content. In the case where polyoxyalkylene chain is less than 10 wt %, the processability in a forming step is poor. Preferably, a polyoxyalkylene chain is equal to or more than 10 wt % with respect to 100 parts by weight of solid content of the aqueous resin (II) and the aqueous polymer including the polyoxyalkylene chain.

The hydrophilic polymer containing polyoxyalkylene chain of 10 wt % or more in terms of solid content has a weight-average molecular weight of 10,000 to 2,000,000, preferably of 20,000 to 1,000,000. In the case of a molecular weight less than 10,000, the persistence of hydrophilicity becomes poor, whereas for a molecular weight more than 2,000,000 the viscosity of the hydrophilic surface treating aqueous solution is increased and its workability becomes poor. Polyethylene oxide (PEO) is manufactured by subjecting ethylene oxide (EO) to ring opening polymerization.

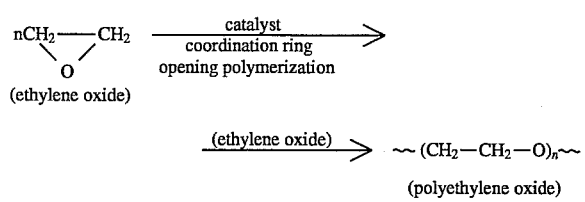

Polyethylene oxide (PEO) is used in the form of an aqueous solution and as used in the present specification is thermoplastic. Within the range of the above molecular weight, PEO presents an extremely high crystallizability, whose crystal system belongs to a monoclinic system (FIG. 1). For this reason, a polyethylene oxide chain readily slips and is superior in processability.

The polymer chain of polyethylene oxide extends along, the C-axis and the conformations around a O—C single bond, C—C single bond, and C—O single bond which constitute its unit chain (—O—$CH_2$—$CH_2$—O—) present the arrangements of anti-type, gauche type, and anti-type, respectively, with the result that the four single bonds of $CH_2$—$CH_2$—O—$CH_2$—$CH_2$ chain are W-shaped on the same plane (FIG. 2). Accordingly, the —$CH_2$—$CH_2$—O— unit of the C-axis is helically arranged in the polymer chain (FIG. 3), resulting in a structure easy to form a complex compound with the various compounds due to a hydrogen bond. It will be appreciated that a polyoxyalkylene chain can present the same effect.

It is therefore easy to form a complex compound with the aqueous resin (II), the complex compound being difficult to dissolve in water to thereby improve the persistency of hydrophilicity after the formation of a film.

The aqueous resin (II) for use in the hydrophilic surface treating aqueous solution, the hydrophilic surface treating method and the hydrophilic surface treating film of the present invention is an aqueous resin in a wide sense, which may include a water-dispersible resin, water-soluble resin, water-soluble hardening agent or a resin to be added for the purpose of hardening, and a water-dispersible hardening agent or resin to be added for the purpose of hardening.

The aqueous resin (II) may, for example, include the following.

(a) Unsaturated polymerizeable monomers containing an amide group and/or hydroxyl group or an unsaturated polymerized aqueous polymer:

polyvinyl alcohol obtained by partial saponification of polyvinyl acetate resin; polyvinyl pyrrolidone; polymers of (meth)agrylamide such as N-methylol(meth)acrylamide derivatives; etc.

Polyvinyl alcohol obtained by partially saponifying a polyvinyl acetate resin exhibits a function of conferring odor-proof properties and hydrophilicity. Polyvinyl pyrrolidone exhibits a function of slightly improving the persistency of hydrophilicity. N-methylol(meth)acrylamide exhibits functions of improving the adhesion of the hydrophilic film as well as improving the water-proof properties. As long as the effect of the present invention is not impaired, there may added a polyvinyl acetate resin, polyvinyl chloride resin, vinyl chloride/ vinyl acetate copolymer, a polymer of (meth)acrylamide, and so on.

(b) Aqueous natural polymer or its derivatives:

cellulose derivatives or methyl cellulose derivatives such as carboxymethyl cellulose (CMC), hydroxyethyl cellulose (HEC), hydroxypropyl cellulose (HPC), methyl cellulose (MC), ethyl cellulose (EC), ethylhydroxyethyl cellulose (EHEC), etc. The cellulose derivatives are not limited to these, but can be a carboxymethylether, carboxylethylether, hydroxymethylether, or a hydroxymethylether, respectively, of cellulose, or starch acetate, or starch phosphate. Methyl cellulose derivatives are not limited to these, but can be adducts obtained by adding a hydroxyethyl group and hydroxypropyl group to methyl cellulose. Furthermore, gum or polysaccharide derivatives containing a carboxyl group or obtained by adding ethylene oxide (EO) or propylene oxide (PO) are also available. Tannic acid, lignin sulfonic acid, alginic acid, hyaluronic acid, etc., are also available. Polyglutamic acid (PGA) may be used. It is particularly preferable to use polyglutamic acid since it remarkably improves the persistency of hydrophilicity. Incidentally, polyglutamic acid includes $\gamma$-PGA and $\alpha$-PGA, which may be alternatively used.

(c) Aqueous alkyd resin:

Aqueous alkyd resin is obtained by condensing polyol such as glycerin, pentaerythritol, ethylene glycol and trimethytol ethane, and a higher fatty acid derived from fat and oil, for example, such as a dibasic acid such as palmitic acid, phthalio anhydride, and maleic anhydride.

(e) Aqueous polyester resin:

Aqueous polyester resin may be one obtained by half-esterifying the hydroxyl group in polyester resin with trimellitic anhydride and by neutralizing a residual carboxylic acid group with amine so as to confer aqueous properties thereon. Also available is one obtained by reacting polyethylene glycol with a polybasic acid so as to confer aqueous properties on the polyester resin.

(f) Aqueous polybutadiene resin:

Aqueous polybutadiene resin may be one obtained by polymerizing butadiene with a catalyst and those of a 1,2-bond type, and a 1,4-bond type which can be alternatively used. Their films can be formed with the aid of a peroxide, sulfur or baking and so on.

(g) Aqueous polyamide resin:

(1) one obtained by ring opening polymerizing caprolactam.

(2) one obtained by polycondensing hexamethylenediamine and adipic acid.

(3) one obtained by polycondensing hexamethylenediamine and sebacic acid.

(4) one obtained by polycondensing 11-aminoundecanoic acid.

(5) one obtained by ring opening polymerizing $\omega$-laumlactam or by polycondensing 12-aminododecanoic acid.

The above may be dissolved in water. For example, water-soluble nylon which is soluble in water and/or alcohol is available.

(h) Aqueous epoxy resin:

Aqueous epoxy resin can be a diglycidyl ether or polyglycidyl ether of an aliphatic polyhydric alcohol, dicarboxylic acid diglycidyl ester, or epoxy compound including a nitrogen heterocycle.

Water dispersible epoxy resin can be one obtained by adding a proper emulsifier to water or a liquid mixture of water and an organic solvent to dispersion emulsify the epoxy resin, and one obtained by denaturalizing the epoxy resin to be dissolved in water or to be dispersion emulsified. More specifically, it can be one obtained by introducing a hydrophilic group into an epoxy resin or by introducing an anionic group such as a carboxyl group or cationic group such as an amino group into an epoxy group and neutralizing it with a hydroxyl group or acid to confer aqueous properties such as a polymer electrolyte.

(i) Aqueous polyurethane resin:

Aqueous polyurethane resin can be one obtained by introducing an anionic group or cationic group into molecules and conferring aqueous properties thereto. It may be one obtained by adding bisulfite to a urethane prepolymer whose distal group is an isocyanate group so as to block the isocyanate group and conferring aqueous properties thereon due to hydrophilicity of sulphonate. Also available is one obtained by blocking a polyurethane prepolymer with a blocking agent and then compulsorily dispersion emulsifying it.

(j) Aqueous phenolic resin:

Aqueous phenolic resin may be one obtained by adding an aldehyde such as formalin, furfural to ones having a phenolic-OH group such as phenol, xylenol, p-alkylphenol, p-phenylphenol, chlorophenol, bisphenol A, phenolsulphonic acid, and resorcin, and conferring aqueous properties on the thus condensed polymer. These can be generally classified as phenol/formalin resin, cresol/formalin resin, phenol/furfural resin, resorcin resin, etc. The aqueous phenolic resin forms a network between resins and functions to improve the film forming properties.

(k) Aqueous amino resin:

Aqueous amino resin can be, for example, one obtained by conferring water solubility on a melamine resin such as n-butylated melamine resin and isobutylated melamine resin or urea resin. These resins are ordinarily obtained by addition reacting or addition condensing amino compounds such as melamine and benzoguanamine with an aldehyde such as formaldehyde, paraformaldehyde, etc., and by etherifying the product with a monohydric alcohol having a carbon number of 1 to 4. The amino resin forms a network between resins and functions to improve the film forming properties. A specific example of the melamine resin can be alkoxymethylmelamine resin whose alkoxyl group is methoxy, ethoxy, n-butoxy, i-aqueous butoxy, etc.

The (l) Aqueous inorganic cross-linking agent, for example, may include the following:

Aqueous inorganic cross-linking agent is a metallic compound capable of forming an aqueous polymer or copolymer and complex compound and, in particular, can be compounds of chromium (Cr), Ti (titanium), Aluminum (Al), Zinc (Zn), Zirconium (Zr), etc.

Although the above (a) to (l) are essential in the present invention, as an optional resin there may be used a resin capable of combining with at least one of (a) to (l), the resin including poly(meth)acrylic acid, (meth)acrylic acid/(meth)acrylic acid ester copolymer, and styrene/(meth) acrylic copolymer.

A hydrophilic surface treating aqueous solution containing (I) an aqueous polymer including a polyoxyalkylene chain of 10 wt % or more in terms of solid content and having a weight-average molecular weight of 10,000 to 2,000,000; and (II) at least one aqueous resin selected from the above (a) to (l) has a ratio of the loadings of (I) with respect to the sum of the loadings of (I) and (II): [(I)/{(I)+(II)}], the ratio being preferably 0.1 to 0.9, and more preferably 0.2 to 0.5. When [(I)/{(I)+(II)}] is less than 0.1, the processability in a forming step becomes poor, whereas when it is over 0.9, the film forming properties of the hydrophilic surface treating film deteriorate.

Within a range not impairing the effect of the invention, ammonia water may be added.

Tables 1 and 2 depict preferred examples of compositions of a hydrophilic surface treating aqueous solution containing (I) an aqueous polymer including a polyoxyalkylene chain of 10 wt % or more in terms of solid content and having a weight-average molecular weight of 10,000 to 2,000,000; and (II) at least one aqueous resin selected from the above (a) to (l).

Particularly preferred are Nos. 13, 18 and 20.

TABLE 1

Examples of Composition for Hydrophilic Surface Treating Aqueous Resin Solution consisting of Polyethylene Oxide and Aqueous

| Composition No. | Polyethylene oxide (PEO) | 28%- ammonia water | Aqueous resin | | | | | | Ratio of solids content | Others |
| --- | --- | --- | --- | --- | --- | --- | --- | --- | --- | --- |
| | | | PGA | PVA | PVP | CMC | W, B-RH$_2$ | ZrF$_6$ | Acrylic monomer | PAA |
| 1 | 10~95 | — | — | 5~90 | — | — | — | — | — | — |
| 2 | 10~70 | (8~52) | 30~90 | — | — | — | — | — | — | — |
| 3 | 10~90 | — | — | — | 10~90 | — | — | — | — | — |
| 4 | 10~90 | — | — | — | — | 10~90 | — | — | — | — |
| 5 | 10~90 | — | — | — | — | — | 10~90 | — | — | — |
| 6 | 10~80 | — | — | — | — | — | — | — | 20~90 | — |
| 7 | 10~78 | (1.7~66) | — | 10~78 | — | — | — | — | 10~70 | 2~70 |
| 8 | 10~78 | (1.7~59) | — | — | 10~78 | — | — | — | 10~70 | 2~70 |
| 9 | 10~78 | (1.7~59) | — | — | — | 10~78 | — | — | 10~70 | 2~70 |
| 10 | 10~83 | (1.7~63) | — | — | — | — | 5~78 | — | 10~70 | 2~75 |

Note)
PGA: polyglutamic acid,
PVA: polyvinyl alcohol,
PVP: polyvinylpyrrolidone,
CMC: carboxymethyl cellulose,
W, B-R: polyamide resin, urethane resin, epoxy resin, phenolic resin, melamine resin, urea resin,
acrylic monomer: N-methylol acrylamide,
PAA: polyacrylic acid
*[1])Ammonia water which is represented in weight percentage is not included in solids content since it volatilizes during the baking process.

TABLE 2

Examples of Composition for Hydrophilic Surface Treating Aqueous Resin Solution consisting of Polyethylene Oxide and Aqueous

| Composition No. | Polyethylene oxide (PEO) | 28%- ammonia water | Aqueous resin | | | | | | Ratio of solids content | Others |
| --- | --- | --- | --- | --- | --- | --- | --- | --- | --- | --- |
| | | | PGA | PVA | PVP | CMC | W, B-RH$_2$ | ZrF$_6$ | Acrylic monomer | PAA |
| 11 | 10~78 | (1.7~59) | — | 10~78 | — | — | — | — | 10~70 | 2~70 |
| 12 | 10~78 | (1.7~59) | — | — | 10~78 | — | — | — | 10~70 | 2~70 |
| 13 | 10~78 | (1.7~66) | — | — | — | 10~78 | — | — | 10~70 | 2~78 |
| 14 | 10~83 | (1.7~63) | — | — | — | — | 5~78 | — | 10~70 | 2~75 |
| 15 | 10~90 | (1.7~72) | — | — | — | — | 5~88 | — | — | 2~85 |
| 16 | 10~75 | (1.3~40) | 5~70 | — | 10~75 | — | — | — | 10~70 | — |
| 17 | 10~68 | (1.7~50) | — | 10~68 | — | 10~68 | — | — | 10~68 | 2~60 |

TABLE 2-continued

Examples of Composition for Hydrophilic Surface Treating
Aqueous Resin Solution consisting of Polyethylene Oxide and Aqueous

| Composition No. | Polyethylene oxide (PEO) | 28%-ammonia water | Aqueous resin | | | | | | Ratio of solids content | |
|---|---|---|---|---|---|---|---|---|---|---|
| | | | PGA | PVA | PVP | CMC | W, B-RH$_2$ | ZrF$_6$ | Acrylic monomer | Others PAA |
| 18 | 10~73 | (3~94) | 5~68 | 10~73 | — | — | — | — | 10~70 | 2~65 |
| 19 | 10~73 | (3~94) | 5~68 | 5~68 | 5~68 | — | — | — | 10~70 | 2~65 |
| 20 | 10~76 | (3~98) | 5~71 | — | — | 5~71 | — | 2~20 | 10~70 | 2~68 |

Note)
PGA: polyglutamic acid,
PVA: polyvinyl alcohol,
PVP: polyvinylpyrrolidone,
CMC: carboxymethyl cellulose,
W, B-R: polyamide resin, urethane resin, epoxy resin, phenolic resin, melamine resin, urea resin, acrylic monomer: N-methylol acrylamide,
PAA: polyacrylic acid
[*1)]Ammonia water which is represented in weight percentage is not included in solids content since it volatilizes during the baking process.

The Second Hydrophilic Surface Treating Aqueous Solution

Description will now be made of a hydrophilic surface treating film containing in terms of solid content 5 to 50 parts by weight of polymer (I) having a weight average molecular weight of 10,000 to 2,000,000 and including a polyoxyalkylene chain of 10 wt % or more and 5 to 50 parts by weight of polyacrylic acid in terms of solid content, with respect to total 100 parts by weight of components consisting of 5 to 25 parts by weight of an sodium salt and/or potassium salt of carboxymethyl cellulose; 25 to 50 parts by weight of an ammonium salt of carboxymethyl cellulose; and 25 to 70 parts by weight of N-methylol acrylamide.

Carboxymethyl cellulose for use as a sodium salt, potassium salt, or ammonium salt has in general a degree of polymerization of 30 to 800. In the case of the degree of polymerization less than 30, the anti-water solubility is poor, whereas when it is over 800 the viscosity is increased and workability becomes low. The preferred degree of polymerization is 80 to 500. This belongs to (b) of the aqueous resin (II).

The sodium salt and potassium salt of carboxymethyl cellulose have a function to confer hydrophilicity. In order to effectively demonstrate this function, the amount of sodium salt and potassium salt of carboxymetyl cellulose within the hydrophilic surface treating agent is 5 to 25 parts by weight. When less than 5 parts by weight, the hydrophilicity (which is represented by the contact angle of water) is small, whereas if over 25 parts by weight odor may be disadvantageously produced. A preferred content is 9 to 16 parts by weight.

The ammonium salt of carboxymethyl cellulose exhibits a function to reduce the odor. In order to effectively demonstrate this function, the content of the NH$_4$ salt of carboxymethyl cellulose within the hydrophilic surface treating aqueous solution is 25 to 50 parts by weight. When less than 25 parts by weight, the odor suppressing effect is insufficient, whereas if it is over 50 parts by weight the hydrophilicity is lowered. The preferred content is 30 to 45 parts by weight. The weight ratio of the Na salt and/or K salt of carboxymethyl cellulose to the NH$_4$ salt is 0.1:1 to 1:1. When the Na salt and/or K salt is less than 0.1 of the NH$_4$ salt, the hydrophilicity is insufficient, whereas if it is over 1 the odor suppressing effect becomes poor. The preferred composition ratio of Na salt and/or K salt/NH$_4$ is 0.2 to 0.53.

N-methylolacrylamide improves the adhesion of the hydrophilic film and has a function to improve the anti-water-solubility. The content of the n-methylolacrylamide is 25 to 70 parts by weight. When less than 25 parts by weight, the adhesion (film forming properties) of the film and anti-watersolubility are poor, whereas with over 70 parts by weight the hydrophilicity is lowered. The ratio of the sum of Na salt and/or K salt of carboxymethyl cellulose and NH$_4$ salt with respect to N-methylolacrylamide is 0.43 to 3.0. When less than 0.43 the hydrophilicity is poor, whereas when over 3.0 there is formed a film insufficient in film forming properties and anti-water-solubility. A preferred ratio is 0.64 to 1.56. This belongs to (a) of aqueous resin (II).

Polyacrylic acid contributes to the improvement in the persistency of hydrophilicity. The content of the polyacrylic acid is 5 to 50 parts by weight with respect to 100 parts by weight of the total of the sodium salt and/or potassium salt of carboxymethyl cellulose, ammonia salt of carboxymethyl cellulose and N-methylolacrylamide. When less than 5 the effect of improving the persistency of hydrophilicity is poor, whereas if over 50 parts by weight are used the anti-water-solubility becomes low.

The preferred content is 10 to 30 parts by weight. In the present invention, polyacrylic acid is not limited to one having the structure unit represented by [CH$_2$ CH—COOH], but is intended to include one having the substituent such as a methyl group. This belongs in optional resin, a polymer compound (I) including a polyoxyalkylene chain of 10 wt % or more in terms of solid content and having a weight-average molecular weight of 10,000 to 2,000,000 readily forms a complex compound with aqueous resin (II) to contribute to the improvement in persistency of hydrophilicity and the suppression of odor after heating. The content of an aqueous polymer (I) including a polyoxyalkylene chain of 10 wt % or more in terms of solid content and having a weight-average molecular weight of 10,000 to 2,000,000 is 5 to 50 parts by weight with respect to a total of 100 parts by weight of the sodium salt and/or potassium salt of carboxymethyl cellulose, ammonia salt of carboxymethyl cellulose, and N-methylolacrylamide. When less than 5 parts by weight is used the effect of improving the persistency of hydrophilicity is poor, whereas if over 50 parts by weight is used the anti-water-solubility is lowered. The preferred content is 10 to 30 parts by weight. The ratio of an aqueous polymer including a polyoxyalkylene chain of 10 wt % or more in terms of solid content and having a weight-average molecular weight of 10,000 to 2,000,000 with respect to polyacrylic acid is preferably 0.5 to 2.0, and more preferably 0.7 to 1.5. As aqueous polymer (I) containing polyoxyalkylene chain there can be used ones described in the column of the first hydrophilic surface treating aqueous solution.

The Third Hydrophilic Surface Treating Aqueous Solution

A third hydrophilic surface treating aqueous solution is characterized by further containing a zirconium compound (II). In this case, the content of the zirconium compound is 0.6 to 9 parts by weight (as Zr) in terms of solid content with respect to a total of 100 parts by weight of components consisting of 5 to 25 parts by weight of the sodium salt and/or potassium salt of carboxymethyl cellulose, 25 to 50 parts by weight of the ammonium salt of carboxymethyl cellulose, and 25 to 70 parts by weight of N-methylol acrylamide.

Zirconium compounds are water soluble and in the form of oxide, halogenide, oxygen acid salt, organic acid salt, or complex salt. Ones stable in the treating liquid are used solely or as a combination of 2 or more types.

More specifically, available are oxides and its related compounds: $ZrO_2$, $ZrO_{2l} \cdot_{H2}O$, $M_2ZrO_3$ (zirconium acid and acid salt), $ZrO_3 \cdot 2H_2O$, $K_4ZrO_4 \cdot 2H_2O_2 \cdot 2H_2O$ (peroxo zirconium acid salt); halogenide: $ZrCl_2$, $ZrBr_2$, $ZrI_2$, $ZrCl_3$, $ZrBr_3$, $ZrI_3$, $ZrF_4$, $ZrCl_4$, $ZrBr_4$, $ZrI_4$, $ZrOCl_2 \cdot 8H_2O$, $Zr_2O_3Cl_2$, etc.; oxygen acid salt: $Zr(NO_3)_4 \cdot 5H_2O$, $ZrO(NO_3)_2 \cdot 2H_2O$, $Zr(SO_4)_2$, $Zr(SO_4)_2 \cdot 4H_2O$, $Zro(SO_4)$, $ZrO(H_2PO_4)_2$, $ZrP_2O_7$, $ZrSiO_4$, $ZrCO$ $ZrO(H2PO4)_2$, $ZrP207$, $ZrSiO_4$, $ZrCO_4$. $ZrO_2 \cdot 8H_2O$ (basic zirconium carbonate), etc.; organic acid: $Zr(CH_3CO_2)_4$, $ZrO(CH_3CO_2)_2$, etc.; acids and complex salts: $M_2[ZrF_8]$ (hexafluorozirconate and acid salts), $M_4[ZrF_8]$ (octafluorozirconate (IV) and acid salts), $M_4[Zr(C_2O_4)_4]$ (tetraoxalateziroconate (IV) and acid salts), $(C_5H_5)_2ZrBr_2$, etc. M represents an alkaline metal. Particularly preferred zirconium compounds are hexafluorozirconate and its acid salt, octafluorozirconate and its acid salts, tetraoxalateziroconate and its acid salts, etc., and oxygen acid salts are basic zirconium carbonate, zirconium (IV) nitrate, zirconium (IV) sulfate, etc. These belong in (e) of aqueous resin (II).

The Zr contents of the above zirconium compounds are 0.6 to 9 parts by weight with respect to a total of 100 parts by weight of the sodium salt and/or potassium salt of carboxymethyl cellulose, the ammonium salt of carboxymethyl cellulose, and N-methylol acrylamide. When less than 0.6 parts by weight are used, the effect of improving the alkali resistance and anticorrosion is insufficient, whereas if over 9 parts by weight are used, the viscosity of the treating liquid is increased, resulting in difficulty in coating. 1 to 5 parts by weight are preferable.

The hydrophilic surface treating aqueous solution of the present invention is intended to be coated on pretreated aluminum or aluminum alloy in accordance with the following hydrophilic surface treating method. Thus coated aluminum material is dried at about 200° C. to obtain a hydrophilic surface treating film for precoating.

In the treating method of the present invention, a plate of aluminum or aluminum alloy is first degreased. Then, if necessary, chemical conversion treatment is performed which is pretreating for anticorrosion. Degreasing treatment may be solvent degreasing by use of trichloroethylene, perchloroethylene, gasoline, normal hexane, etc., or alkali degreasing by use of an alkaline solution such as sodium hydroxide, sodium carbonate, sodium silicate, sodium phosphate, etc. The chemical conversion treatment may include phosphoric chromating, coating-type chromating, phenol or urethane series resin primer treatment, and non-chromating.

The phosphoric chromating treatment is performed by use of a treating liquid obtained by adding additives to chromic anhydride and phosphoric acid. The phosphoric chromating treatment may be performed by immersion into a treating liquid or spraying of treating liquid, but is preferably performed by immersion of the fins of a heat exchanger having a complicated configuration. The anticorrsion film obtained by phosphonic chromating treatment is 3 to 50 mg/m$^2$ in the amount of chromium (Cr). When the anticorrosion film is less than 3 mg/m$^2$, the anticorrosion properties are poor, whereas if over 50 mg/m$^2$ the reaction with the hydrophilic film will occur to reduce the hydrophilicity. The aluminum or aluminum alloy on which the anticorrosion film has been formed is cleaned by water. It is preferable that the cleaning by water at that time be performed for about 10 to 30 seconds.

The coating-type chromating treatment is a chromating treatment using a coating means such as a roll coater. In this case, the amount of chromium in the film is preferably 3 to 50 mg/m$^2$.

The non-chromating treatment is executed by a treating agent containing no chromate, for example, a zirconium treating agent. The zirconium treating agent may be a mixture of polyacrylic acid and zirconium fluoride. The amount in this film is 0.1 to 40 mg/m$^2$. In the same manner as the Cr amount, when the Zr amount is less than 0.1 mg/m$^2$ the anticorrosion properties are poor, whereas if it is over 40 mg/m$^2$ the hydrophilicity is inversely lowered. A further effect will be obtained by superposing the zirconium treatment on the chromating treatment.

Phenol series resin primer treatment for conferring even superior anticorrosion properties preferably uses an aqueous resol-type phenolic resin (which is a polymer between phenol and formalin in the presence of the alkali catalyst). The phenol series resin primer may contain melamine resin besides the phenol resin. A preferred melamine resin is an aqueous melamine resin which has been methylated, ethylated and/or butylated, whose content is 50 wt % or less with respect to 50 to 100 wt % of phenolic resin. Otherwise, an acryl series resin may be mixed therein to for improving the processability such as bending or coating workability. After coating the phenol series resin primer, baking is carried out at a temperature of 180° to 280° C. for 10 seconds to 1 minute. The coating film preferably ranges from 0.5 to 2 g/m$^2$. When the coating film is less than 0.5 g/cm$^2$ the anticorrosion properties become poor, whereas if it is over 2 g/m$^2$ the efficiency of heat exchange is lowered, resulting in raised cost.

Typically pretreatment is carried out by combining the degreasing treatment with, as the need arises, any one of the above chemical conversion treatments.

In the hydrophilic surface treating method, a hydrophilic surface treating aqueous solution of the present invention is coated on the pretreated aluminum or aluminum alloy. Coating methods may include a roll-coat method, bar-coat method, immersion method, spray method, and paint-brush method, which are used for precoating. According to the roll-coat method, for example, a hydrophilic film can be obtained by drying at a temperature of 150° to 270° C. for 10 seconds to 1 minute after coating. When the baking temperature in this case is less than 150° C. no film is formed, whereas if the temperature is over 270° C. the persistency of hydrophilicity is insufficient. The film amount of the hydrophilic surface treating film is preferably over 0.05 g/m², and more preferably, lies within the range of 0.1 to 2 g/m². On the contrary, if the film thickness is less than 0.05g/m², the consistency of hydrophilicity and processability of the film will be insufficient.

The hydrophilic surface treating aqueous solution or the hydrophilic surface treating film of the present invention may include a required amount of additives according to the function to be conferred thereon.

In the case of conferring fungus resistance or bacteria resistance, for example, a fungistat or antiseptic may be loaded thereinto. The fungistat or antiseptic can be a quaternary ammonium salt, nitride-containing sulfur compound, halogen-containing nitrogen sulfide, organic iodine compound, benzimidazole compound, etc. The fungistat or antiseptic may be, for example, 2-thiazole-4-irbenzimidazole, methylbenzimidazole-2-ircarbamate, N-dichlorodifluoromethylthio-N'-N'-dimethyl-N-phenylsulfamide, tetramethylthiuram disulfide, N-(trichloromethylthio)-4-cyclohexane-1, 2-dicarboxyimide, 2,4,5,6- tetrachloro-1,3-isophthalonitrile, and 2,3,5,6-tetrachloro-4-(methylsulfonyl)pyridine, bis or (2-pyridylthio)-zinc-1, 1-dioxide. In view of the heat resistance, preferable are 2-thiazole-4-irbenzimidazole, methylbenzimidazole-2-ircarbamate, 2,3,5,6-tetrachloro-4-(methylsulfonyl)pyridine, bis or (2-pyridylthio)-zinc-1, 1-dioxide. A bacteria resistance agent can be, for example, 1,2-benzisothiazoline-3-one(BIT), 2,3,5,6-tetrachloro-4-(methylsulphonyl)pyridine, and 10, 10'-oxybisphenoxyarisine. The amount to be loaded is preferably 15 to 1.5 parts by weight.

In order to improve the workability such as stability, foaming properties, and coating properties of the treating liquid, a surfactant may be added. The surfactant can be any one selected from the group consisting of nonionic, anionic, cationic, and amphoteric surfactants according to the function to be conferred. Used as the nonionic surfactant herein are, for example, polyoxyethylene glycol, polyoxyethylene polyoxypropylene glycol, polyoxypropylene glycol, polyoxyethylene alkylphenylether, glycerin fatty acid partial ester, sorbitan fatty acid partial ester, pentaerythritol fatty acid partial ester, polyoxyehylene sorbitan fatty acid partial ester, and polyoxyethylene alkylether, each having an average molecular weight less than 500. A polyoxyalkylene surfactant for use as a nonionic surfactant may be added for the purpose of contributing to the stability of the above treating liquid, but is not expected to contribute to the lubrication and hydrophilicity.

Used as the anionic surfactant are, for example, a dialkylsulfosuccinate, alkanesulfonate, alkylbenzene sulfonate, alkyldiphenyl etherdisulfonate, alkylnaphthalene sulfonate, sodium salt of a condensate of naphthalenesulfonic acid and formalin, polyoxyethylene sulphophenylether salt, alkylphosphoric ester salt, polyoxyehylene alkyletherphosphoric ester salt, sulfate ester salt of and fatty acid alkylester, alkylsulfate ester salt, polyoxyethylene alkyleter sulfate ester salt, fatty acid monoglyceride sulfate ester salt.

As the cationic surfactant used are and alkylamine salt and dialkylamine salt.

As the amphoteric surfactant used is, for example, N,N,N-trialkyl-N-sulfoalkylene ammoniumbetaine. Incidentally, the loading of the anionic surfactant is preferably 0.1 to 5 parts by weight. When less than 0.1 part by weight is used the loading effect is poor, whereas if over 5 parts by weight are used the anti-water-solubility is lowered.

In the case of effecting coloring, a pigment and/or dye may be loaded. The pigment can be either an inorganic pigment or organic pigment. The inorganic pigment can be, for example, natural pigment such as yellow ocher, etc., a chromate such as chrome yellow, zinc yellow, barium yellow, etc., ferrocyanide such as Prussian blue, etc., oxide such as titanium white, red iron oxide, zinc white, iron black, etc., sulfide such as cadmium yellow, cadmium red, etc., sulfate such as barium sulfate, etc., silicate such as calcium silicate, ultramarine, etc., metallic powder such as bronze powder, aluminum powder, etc., and others such as chrome green, etc. The natural pigment can be, for example, a natural dye lake such as madder lake, a nitroso pigment such as naphthol green, etc., azo pigment such as CURMINE 6B, WATCHY-OUNGRED, pyrazolone red, BENCHDIN YELLOW, Hansa yellow, etc., basic dye lake such Rhodamine lake, Malachite green lake, etc., mordant dye pigment such as alizarin lake, etc., phthalocyanine pigment such as phthalocyanine blue, phthalocyanine green, etc., and other fluorescent pigments, an azine pigment (diamond black), etc. The dye may be aqueous dye or oil dye. The aqueous dye can be, for example, a basic dye such as Rhodamine B, etc., acid dye such as orange 11, etc., and other fluorescent dyes. The oil dye can be, for example, a monoazo dye such as Fast orange R, oil orange, oil yellow, etc., ANTHRAKYNON dye such as ANTHRAKYNON BLUE, ANTHRAKYNON VIOLET, etc., azine dye such as nigrosine, INJURINE, etc., and other basic, acid, metal complex compound dyes. The amount thereof required is loaded.

In the case of conferring anticorrosion, an inhibitor may be added. The inhibitor can be a zirconium compound and chromium compound if the inhibitor component is not included in the component (1) which is the aqueous inorganic crosslinking agent. The zirconium compound may be an oxide, halogenide, oxygen acid salt, organic acid salt or complex salt. The zirconium compounds which are aqueous and stable in the treating liquid are used singly or as a combination of two or more types. More specifically, available are oxides and their related compounds such as $ZrO_2$, $ZrO_2 \cdot xH_2O$, $M_2ZrO_3$ (zirconium acid and acid salts), $ZrO_3 \cdot 2H_2O$, $K_4ZrO_4 \cdot 2H_2O_2 \cdot 2H_2O$ (peroxozirconate), etc., halogenides such as $ZrCl_2$, $ZrBr_2$, $ZrI_2$, $ZrCl_3$, $ZrBr_3$, $ZrI_3$, $ZrF_4$, $ZrCl_4$, $ZrCl_4$, $ZrBr_4$, $ZrI_4$, $ZrOCl_2 \cdot 8H_2O$, $Zr_2O_2Cl_2$, etc., oxygen acid salts such as $Zr(NO_2)_4 \cdot 5H_2O$, $Zr(NO_3)_2 \cdot 2H_2O$, $Zr(SO_4)_2$, $ZR(SO_4)_2 \cdot 4H_2O$, $Zr(SO_4)$, $Zr(H_2PO_4)_2$, $ZrP_2O_7$, $ZrSiP_4$, $ZrCO_4$. $ZrO_2 \cdot 8H_2O$ (basic zirconium carbonate), etc., organic acid salts such as $Zr(CH_3CO_2)_4$, $Zr_2O(CH_3CO_2)_2$, etc., and acids and complex salts such as $M_2[ZrF_6]$ (octafluorozirconium(IV) acid and acid salts), $(C_2H_5)_2ZrBr_2$, etc. M represents an alkaline metal. Particularly preferred zirconium compounds are hexafluorozirconium acid and acid salts, octafluorozirconium acid and acid salts, and tetraoxalate zirconium acid and acid salts. As oxygen acid salts, basic zirconium carbonate, zirconium nitrate, zirconium sulfate, etc., are preferable.

As chromium compounds available are, specifically, oxides such as $CrO$, $Cr_2O_3$, $CrO_3$, $CRrO_5$ (chrome persulfate), etc., chromites such as $MCrO_2$, etc., chromates such as $M_2Cr_2O_7$, etc., bichromates such as $M_2Cr_2O_7$, etc., polychromates such as $M_2Cr_nO_{3n+1}$, etc., peroxochromates such as $M_2Cr_2O_{12}$, $M_2CrO_8$ etc., $CrCl_2$, $CrCl_2 \cdot 6H_2O$, $CRCl_2 \cdot 6NH_3$ $CrSO_4 \cdot H_2O$, $CrSO_4 \cdot 7H_2O$, $M_2Cr(SO_4)_2 \cdot 6H_2O$ $Cr(SO_4)_3$, $Cr(SO_4)_3 \cdot 18H_2O$, $MCr(SO_4)_2 \cdot 12H_2O$ $CrS$, $Cr(NO_3)_3 \cdot 9H_2O$, $Cr_2S_3$, $[CrCl(OH_2)_5]Cl_2 \cdot H_2O$ (chloropentaaquochrom (III) salt) $[CrCl(OH_2)_4]Cl \cdot 2H_2O$ (dichlorotetraaquochrom (III) salt), $[CrCl_3(OH_2)_3]$ (trichlorotriaquochrom (III) salt), $M_2[CrCl_5(OH)]$ (pentachloroaquochrom (III) salt), $M_2[CrCl_6]$ (hexachloroaquochrom (III) salt). M represents an alkaline metal.

In the case of conferring a higher level of hydrophilicity, colloidal silica may be added. The loadings are the amounts causing little odor.

For use, the hydrophilic surface treating aqueous solution of the present invention can contain hydrofluoric acid in addition to the above additives.

When directly performing the hydrophilic treatment without forming an anticorrosion film after degreasing, the hydrofluoric acid functions to improve the film forming properties and to improve the anticorrosion and alkali resistance. The loadings are 2.5 to 100 ppm in the treating liquid whose concentration has been so prepared that the amount of the hydrophilic film is 0.05 to 0.5 g/m² as a dry film. When it is less than 2.5 ppm, no effect appears, whereas even if it is over 100 ppm the effect is not expected to be increased correspondingly.

The aqueous high molecular compound according to the present invention exhibits a much higher crystallizability due to the structure of the polyoxyalkylene chain within the aqueous polymer containing a polyoxyalkylene chain of 10 wt % or more in terms of solid content and having a weight-average molecular weight of 10,000 to 2,000,000. This results in superior processability in a forming step. The presence of the alkylene oxide within the aqueous polymer heightens the hydrophilicity of the film. Also, the aqueous polymer having the polyoxyalkylene chain of 10 wt % or more in terms of solid content readily forms a complex compound with at least one of the aqueous resins (II) including (a) to (l) described above, thus resulting in a higher persistency of hydrophilicity after the film formation. The conformation of the polyoxyalkylene chain permits the easy formation of the complex compound with various compounds arising from hydrogen bond.

DESCRIPTION OF THE ACTUAL EXAMPLES

Figure 1:
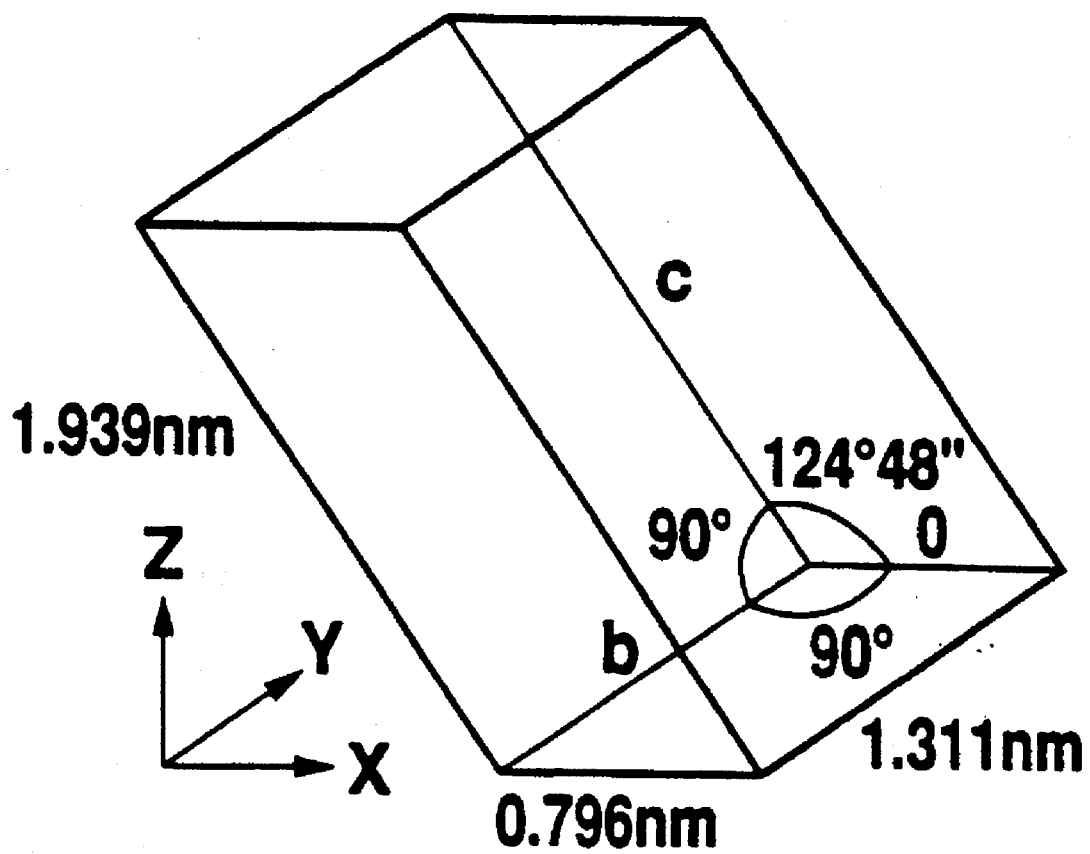
FIG. 1 is a diagram depicting the crystal of polyethylene oxide.
Figure 2:
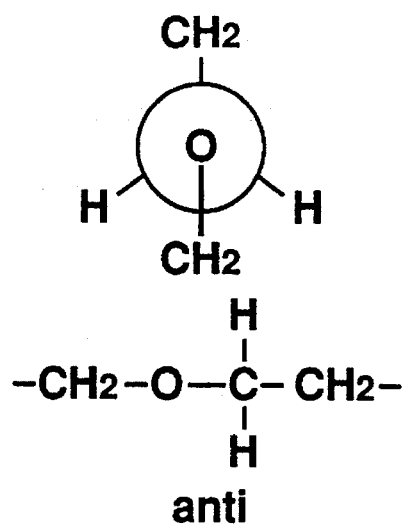
FIGS. 2(a)–2(d) are diagrams depicting the conformation of the polyethylene oxide.
Figure 2:
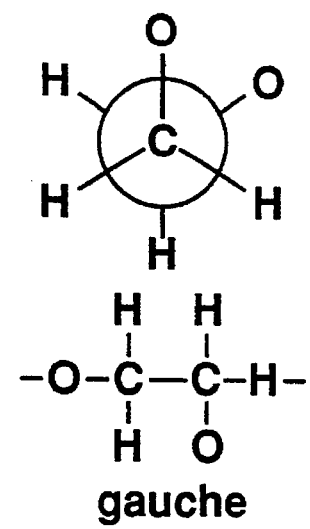
Figure 2:
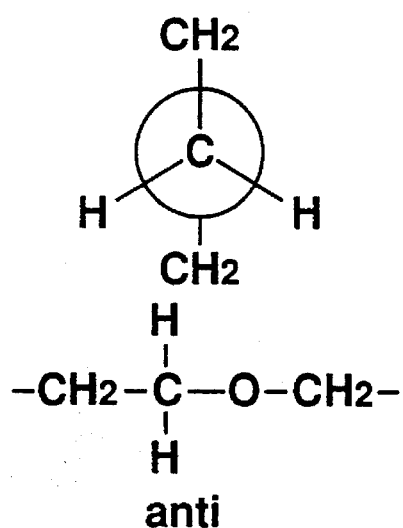
Figure 2:
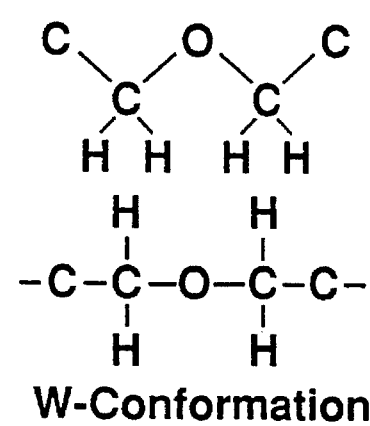
Figure 3:
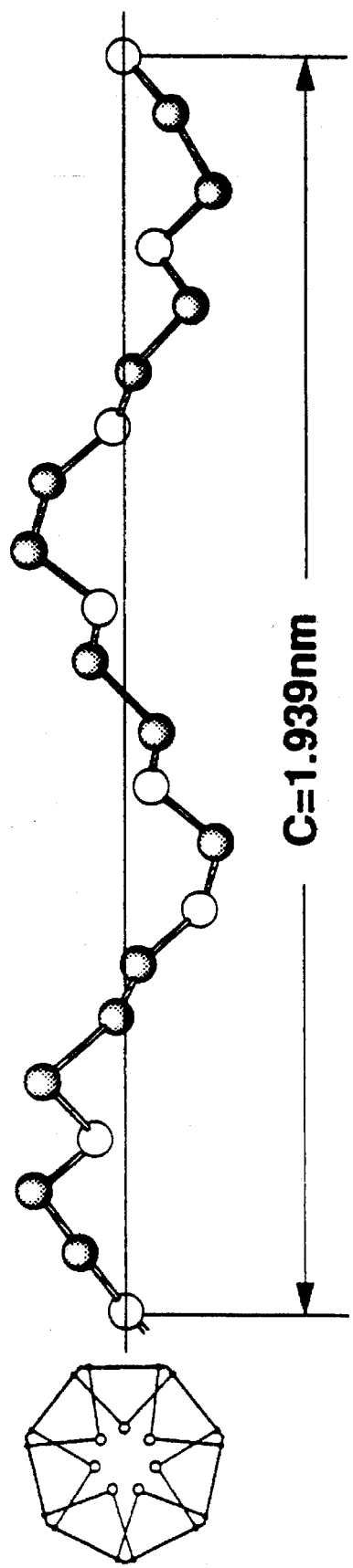
FIG. 3 is a model view of the polyethylene oxide chain.

The present invention will now be specifically described with reference to actual examples and comparison examples.

It will be noted that the following hydrophilic surface treatment method and film performance evaluation test were performed in common among the actual examples and the comparison examples.

Hydrophilic Surface Treatment Method

An aluminum plate was degreased and then chemically converted if necessary. Hydrophilic surface treating aqueous solutions having compositions of the actual examples and comparison examples shown in Tables 3 to 8, 10 to 13 and 15 were prepared whose concentration was regulated to a value according to the workability by dilution with water, applied to the plate by a bar coater #4 and dried for 20 seconds at 200° C. to form a hydrophilic film (dry film 0.1 to 1 g/m2). The thus obtained film was subjected to the following tests.

Performance Evaluation Test (1) Water Contact Angle Measurement Test:

After 20 repetitions of the cycle (warming cycles) in which each sample of aluminum plate which has undergone the above treatment is subjected to flowing water (flow rate: 5 l/hour, tap water) for 8 hours and then dried at 80° C. for 16 hours, the contact angle Q of a water droplet with respect to the dried hydrophilic film was measured. It will be appreciated that this test is intended to evaluate the persistency of hydrophilicity and that the smaller the contact angle is, the better the persistency of hydrophilicity becomes.

Measurement Method

The aluminum plate sample which has been subjected to the above warming cycles was laid horizontally and 5 µl of pure water dropped thereon to measure the contact angle by use of a goniometer (Model CA-Z: conditions: measurement temperature; room temperature, the measurement conducted more than 30 seconds after dropping) manufactured by KYOWA KAIMEN KAGAKU K.K.

| Evaluation | |
| --- | --- |
| excellent | $Q < 20°$ |
| good | $20° \leq Q < 30°$ |
| fair | $30° \leq Q < 40°$ |
| poor | $40° \leq Q$ |

(2) Processability Test:

The friction coefficient of the aluminum plate which has been subjected to the contact angle measurement test was measured by means of a surface properties measuring instrument "Model HEIDON-14" under the conditions of 50 g load with a 5 mm steel ball.

| <Evaluation> | |
| --- | --- |
| excellent | friction coefficient < 0.1 |
| good | $0.1 \leq$ friction coefficient < 0.2 |
| fair | $0.2 \leq$ friction coefficient < 0.3 |
| poor | $0.3 \leq$ friction coefficient |

Agents for degreasing, phosphoric chromating and coating-type chromating, and phenolic resin primer for use in the substrate treatment in the actual examples and comparison examples are as follows.

Degreasing was effected by subjecting the aluminum plate and aluminum alloy plate to SURFCLEANER 322N-8 (Brand name of Nippon Paint Co., Ltd., SURFCLEANER is a registered trademark of Nippon Paint Co., Ltd.).

For phosphoric chromating treatment, ALSURF 407/47 (Brand name of Nippon Paint Co., Ltd., ALSURF is a registered trademark of Nippon Paint Co., Ltd.) was used to obtain a film amount (in terms of Cr content) of 20 mg/m². For coating-type chromating treatment, SURFALCOAT 427 (Brand name of Nippon Paint Co., Ltd., SURFALCOAT is a registered trademark of Nippon Paint Co., Ltd) was used to obtain a film amount (in terms of Cr content) of 20 mg/m². For zirconic agent treatment, SURFALCOAT 430A/430B (Brand name of Nippon Paint Co., Ltd.) was used to obtain a Zr content of 5 mg/m². As phenolic resin primer there was used SURFALCOAT 450 (Brand name of Nippon Paint Co., Ltd), resulting in a film amount of 500 mg/m².

Then, after the above-described substrate treatment, there was applied a surface treating aqueous solution which had been prepared based on the compositions shown in Tables 3 to 8, 10 to 13 and 15. The resultant hydrophilic surface treatment film underwent the performance evaluation. The results are shown in Tables 3 to 6, 9 to 12, 14 and 16.

Actual Examples 1 to 3

Table 3 shows the results of performance evaluation depending on the difference in magnitude of molecular weight of the polyethylene oxide (PEO:(I)) with aqueous resin (II).

Table 4. Incidentally, the aqueous resin is one easily dissolved into the water, in particular.

TABLE 3

| Actual examples | Substrate treatment | PEO Mw: 20,000 | PEO Mw: 500,000 | Aqueous resin Mw: 1,000,000 | Processability PVA*1 | Persistency of hydrophilicity |
|---|---|---|---|---|---|---|
| 1 | Phosphoric chromating | 5 | — | — | 5 excellent | good |
| 2 | " | — | 5 | — | 5 excellent | excellent |
| 3 | " | — | — | 5 | 5 excellent | excellent | note)
Mw: Weight-average molecular weight
*1PVA: polyvinyl alcohol

Actual Examples 4 to 10 and Comparison Examples 1 to 7

Performance evaluation was effected for the hydrophilic surface treating aqueous solution containing PEO(I) and an aqueous resin(II) as its main components (Actual examples 4 to 10) and the surface treating aqueous solution containing an aqueous resin without PEO as its main component (Comparison examples 1 to 7). The results are shown in

TABLE 4

| | Substrate treatment | PEO Mw: 500,000 | 28% ammonia-water | γ-PGA | PVA | CMC | PVP | poly-amide | urethane resin | epoxy resin | Process-ability | Persistency of hydro-philicity |
|---|---|---|---|---|---|---|---|---|---|---|---|---|
| Actual examples | | | | | | | | | | | | |
| 4 | phosphoric chromating | 5 | 2.5 | 5 | — | — | — | — | — | — | excellent | excellent |
| 5 | phosphoric chromating | 5 | — | — | — | 5 | — | — | — | — | excellent | excellent |
| 6 | phosphoric chromating | 5 | — | — | 5 | — | — | — | — | — | excellent | excellent |
| 7 | phosphoric chromating | 5 | — | — | — | — | 5 | — | — | — | excellent | excellent |
| 8 | phosphoric chromating | 5 | — | — | — | — | — | 5 | — | — | excellent | excellent |
| 9 | phosphoric chromating | 5 | — | — | — | — | — | — | 5 | — | excellent | good |
| 10 | phosphoric chromating | 5 | — | — | — | — | — | — | — | 5 | excellent | good |
| Comparison examples | | | | | | | | | | | | |
| 1 | phosphoric chromating | — | 5 | 10 | — | — | — | — | — | — | poor | excellent |
| 2 | phosphoric | — | — | — | 10 | — | — | — | — | — | fair | good |

TABLE 4-continued

| | Substrate treatment | Composition (Part by weight) | | | | | | | | | Persistency of |
|---|---|---|---|---|---|---|---|---|---|---|---|
| | | PEO Mw: 500,000 | 28% ammonia-water | γ-PGA | PVA | CMC | PVP | poly-amide | urethane resin | epoxy resin | Process-ability | hydro-philicity |
| 3 | chromating phosphoric chromating | — | — | — | — | 10 | — | — | — | — | poor | excellent |
| 4 | phosphoric chromating | — | — | — | — | — | 10 | — | — | — | fair | good |
| 5 | phosphoric chromating | — | — | — | — | — | — | 10 | — | — | good | fair |
| 6 | phosphoric chromating | — | — | — | — | — | — | — | 10 | — | poor | poor |
| 7 | phosphoric chromating | — | — | — | — | — | — | — | — | 10 | poor | poor |

Note)
Mw: Weight-average molecular weight
*1)PEO: polyethylene oxide (Mw: 500,000), PVP: polyvinyl pyrrolidone (Mw: 20,000), polyamide: AQ NYLON P-70 (manufactured by TORAY IND, INC.), CMC: carboxymethyl cellulose (Mw: 20,000), urethane resin: ADEKA BONLITER HUX-232 (manufactured by ASAHI DENKA KOGYO K.K.), PVA: polyvinyl alcohol (Mw: 20,000), epoxy resin: EPOLSION EA55 (manufactured by KANEBO NSC K.K.), γ-PGA: polyglutamic acid (Mw: 300,000)

Actual Examples 11 to 14 and Comparison Examples 8 to 11

Performance evaluation was effected for the hydrophilic surface treating aqueous solution containing PEO(I) and an aqueous resin(II) as its main components (Actual examples 11 to 14) and the surface treating aqueous solution containing the aqueous resin without PEO as its main component (Comparison examples 8 to 11). The results are shown in Table 5. Incidentally, the aqueous resin for use herein was one used as a general hardening agent.

to 14). The results are shown in Table 6. The substrate treatment herein is intended for degreasing.

TABLE 5

| | | Composition (Part by weight) | | | | | | |
|---|---|---|---|---|---|---|---|---|
| Actual examples | Substrate treatment | PEO Mw: 500,000 | phenolic resin | melamine resin | urea resin | acrylic monomer | Processability | Persistency of hydrophilicity |
| 11 | phosphoric chromating | 5 | 5 | — | — | — | excellent | good |
| 12 | " | 5 | — | 5 | — | — | excellent | good |
| 13 | " | 5 | — | — | 5 | — | excellent | good |
| 14 | " | 5 | — | — | — | 5 | excellent | excellent |
| Comparison examples | | | | | | | | |
| 8 | phosphoric chromating | — | 10 | — | — | — | poor | poor |
| 9 | " | — | — | 10 | — | — | poor | poor |
| 10 | " | — | — | — | 10 | — | poor | poor |
| 11 | " | — | — | — | — | 10 | poor | poor |

Note)
Mw: Weight-average molecular weight
*1)phenolic resin: RESITOP PL2761 (manufactured by GUNEI CHEMICAL IND., Co., Ltd), melamine resin: NIKALACMW-22 (manufactured by SANWA CHEMICAL Co., Ltd), urea resin: UFR-65 (manufactured by MITSUI TOATSU CHEMICAL INC.), acrylic monomer: N-methylol acrylamide Actual Examples 15 to 17 and Comparison Examples 12 to 14

Performance evaluation was effected for the hydrophilic surface treating aqueous solution containing PEO(I) and an aqueous resin(II) as its main components with the addition of an aqueous resin for use as a hardening agent (Actual examples 15 to 17) and the surface treating aqueous solution containing an aqueous resin without PEO and an aqueous resin for use as a hardening agent (Comparison examples 12

TABLE 6

| Actual examples ty | Substrate treatment | Composition (Part by weight) | | | | | | | | Process-ability | Persistency of Hydrophilicity |
|---|---|---|---|---|---|---|---|---|---|---|---|
| | | PEO Mw: 500,000 | 28%-ammonia water | Aqueous resin[*1)] | | | | | | |
| | | | | γ-PGA | PVA | CMC | $H_2ZrF_6$ | acrylic monomer | Others PAA | | |
| 15 | only degreasing | 2 | 2 | — | 5 | — | — | 3 | 4 | good | excellent |
| 16 | " | 4.5 | 2 | 4 | 5 | — | — | 3 | — | excellent | excellent |
| 17 | " | 4.5 | 2.3 | 3 | — | 3 | 0.6 | 3 | 1.5 | excellent | excellent |
| Comparison examples | | | | | | | | | | | |
| 12 | only degreasing | — | 2 | — | 5 | — | — | 3 | 4 | fair | fair |
| 13 | " | — | 2 | 4 | 5 | — | — | 3 | — | poor | good |
| 14 | " | — | 2.3 | 3 | — | 3 | — | 3 | 1.5 | poor | good |

Note)
Mw: Weight-average molecular weight
[*1)]PEO: polyethylene oxide (Mw: 500,000), CMC: carboxymethyl cellulose (Mw: 20,000), acrylic monomer: N-methylol acrylamide, γ-PGA: polyglutamic acid (Mw: 300,000), PAA: polyacrylic acid (Mw: 1,000,000) PVA: polyvinyl alcohol (Mw. 20,000)

Actual Examples 18 to 44 and Comparison Examples 15 to 17

Performance evaluation was effected for the hydrophilic surface treating aqueous solution containing PE0(I) and an aqueous resin(II) as its main components with the addition of an aqueous resin for use as a hardening agent (Actual examples 18 to 44) and the surface treating aqueous solution containing an aqueous resin without PE0 and an aqueous resin for use as a hardening agent (Comparison examples 15 to 17). The compositions are shown in Tables 7 and 8, and the results are shown in Table 9. The substrate treatment herein is intended for degreasing and phosphoric chromating.

TABLE 7

Substrate treatment and composition for hydrophilic surface treating aqueous solution

| Actual examples | Substrate treatment | Composition (Part by weight) | | | | | | | | |
|---|---|---|---|---|---|---|---|---|---|---|
| | | PEO[*2)] | 28% ammonia water | Aqueous resin[*1)] | | | | | | |
| | | | | γ-PGA | PVA | CMC | PVP | polyamide | urethane resin | epoxy resin |
| 18 | phosphoric chromating | 2 | 2 | — | 5 | — | — | — | — | — |
| 19 | " | 4.5 | 2 | — | 5 | — | — | — | — | — |
| 20 | " | 10 | 2 | — | 5 | — | — | — | — | — |
| 21 | " | 4.5 | 2 | — | 5 | — | — | — | — | — |
| 22 | " | 4.5 | 2 | — | 5 | — | — | — | — | — |
| 23 | " | 4.5 | 2 | — | 2 | — | — | — | — | — |
| 24 | " | 4.5 | 2 | — | 8 | — | — | — | — | — |
| 25 | " | 4.5 | 2 | — | — | 5 | — | — | — | — |
| 26 | " | 4.5 | 2 | — | — | — | 5 | — | — | — |
| 27 | " | 4.5 | 2 | — | — | — | — | 5 | — | — |
| 28 | " | 4.5 | 2 | — | — | — | — | — | 1 | — |
| 29 | " | 4.5 | 2 | — | — | — | — | — | — | 1 |
| 30 | " | 4.5 | 2 | — | 5 | — | — | — | — | — |
| 31 | " | 4.5 | 2 | — | 5 | — | — | — | — | — |
| 32 | " | 4.5 | 2 | — | 5 | — | — | — | — | — |
| Comparison examples | | | | | | | | | | |
| 15 | phosphoric chromating | — | 2 | — | 5 | — | — | — | — | — |
| 16 | " | — | 2 | 4 | 5 | — | — | — | — | — |
| 17 | " | — | 2.3 | 3 | — | 3 | — | — | — | — |

TABLE 7-continued

Substrate treatment and composition for hydrophilic surface treating aqueous solution

| Actual examples | Composition (Part by weight) Aqueous resin phenolic resin | melamine resin | urea resin | acrylic monomer | Others PAA |
|---|---|---|---|---|---|
| 18 | — | — | — | 3 | 4 |
| 19 | — | — | — | 3 | 4 |
| 20 | — | — | — | 3 | 4 |
| 21 | — | — | — | 3 | 1 |
| 22 | — | — | — | 3 | 7 |
| 23 | — | — | — | 3 | 4 |
| 24 | — | — | — | 3 | 4 |
| 25 | — | — | — | 3 | 4 |
| 26 | — | — | — | 3 | 4 |
| 27 | — | — | — | 3 | 4 |
| 28 | — | — | — | 3 | 4 |
| 29 | — | — | — | 3 | 4 |
| 30 | 1 | — | — | — | 4 |
| 31 | — | 1 | — | — | 4 |
| 32 | — | — | 1 | — | 4 |
| Comparison examples | | | | | |
| 15 | — | — | — | 3 | 4 |
| 16 | — | — | — | 3 | — |
| 17 | — | — | — | 3 | 1.5 |

*1)same as "*1" in tables 4, 5 and 6.
*2)Mw: 500,000

TABLE 8

Substrate treatment and composition for hydrophilic surface treating aqueous solution

| Actual examples | Substrate treatment | PEO*2) | Composition (Part by weight) 28% ammonia water | Aqueous resin or Zirconium Compound*1) γ-PGA | PVA | CMC | $H_2ZrF_6$ | acrylic monomer | Others PAA |
|---|---|---|---|---|---|---|---|---|---|
| 33 | phosphoric chromating | 4.5 | 2 | 4 | 5 | — | — | 3 | — |
| 34 | " | 4.5 | 2 | — | 5 | 5 | — | 3 | 4 |
| 35 | " | 4.5 | 3.5 | 3 | 5 | — | — | 3 | 4 |
| 36 | " | 4.5 | 3.5 | 3 | 5 | 5 | — | 3 | 4 |
| 37 | " | 4.5 | 2.3 | 3 | — | 3 | 0.6 | 3 | 1.5 |
| 38 | " | 4.5 | 1.3 | 1 | — | 3 | 0.6 | 3 | 1.5 |
| 39 | " | 4.5 | 3.3 | 5 | — | 3 | 0.6 | 3 | 1.5 |
| 40 | " | 4.5 | 1.7 | 3 | — | 3 | 0.6 | 3 | 0.3 |
| 41 | " | 4.5 | 3 | 3 | — | 3 | 0.6 | 3 | 3 |
| 42 | " | 4.5 | 2.3 | 3 | — | 1 | 0.6 | 3 | 1.5 |
| 43 | " | 4.5 | 2.3 | 3 | — | 5 | 0.6 | 3 | 1.5 |
| 44 | " | 4.5 | 2 | — | — | 5 | 0.6 | 5 | 4 |

*1)same as "*1" in Tables 4, 5 and 6
*2)Mw: 500,000

TABLE 9

Results of Characteristic Evaluation

| | Processability | Persistency of hydrophilicity |
|---|---|---|
| Actual examples | | |
| 18 | good | excellent |
| 19 | excellent | excellent |
| 20 | excellent | excellent |
| 21 | excellent | excellent |
| 22 | good | excellent |

TABLE 9-continued

Results of Characteristic Evaluation

| | Processability | Persistency of hydrophilicity |
|---|---|---|
| 23 | excellent | excellent |
| 24 | excellent | good |
| 25 | excellent | excellent |
| 26 | excellent | excellent |
| 27 | excellent | excellent |
| 28 | excellent | good |
| 29 | excellent | good |
| 30 | excellent | excellent |

TABLE 9-continued

Results of Characteristic Evaluation

| | Processability | Persistency of hydrophilicity |
|---|---|---|
| 31 | excellent | excellent |
| 32 | excellent | excellent |
| 33 | excellent | excellent |
| 34 | good | excellent |
| 35 | good | excellent |
| 36 | good | excellent |
| 37 | excellent | excellent |
| 38 | excellent | excellent |
| 39 | excellent | excellent |
| 40 | excellent | excellent |
| 41 | excellent | excellent |
| 42 | excellent | excellent |
| 43 | excellent | excellent |
| 44 | excellent | excellent |
| Comparison examples | | |
| 15 | fair | fair |
| 15 | poor | good |
| 17 | poor | good |

Actual Examples 45 to 53 and Comparison Examples 18 to 26

Performance evaluation was effected for the hydrophilic surface treating aqueous solution containing PEO(I) and an aqueous resin(II) as its main components with the addition of an aqueous resin for use as a hardening agent (Actual examples 45 to 53) and the surface treating aqueous solution containing an aqueous resin without PEO and an aqueous resin for use as a hardening agent (Comparison examples 18 to 26), The results are shown in Table 10, The substrate treatment in the actual examples 45 to 47 and the comparison examples 18 to 20 herein is intended for the execution of the degreasing and coating-type chromating, The substrate treatment in the actual examples 48 to 50 and the comparison examples 21 to 23 is intended for the execution of the degreasing and zirconium agent treatment, The substrate treatment in the actual examples 51 to 53 and the comparison examples 24 to 26 is intended for the execution of the degreasing and phenolic resin primer treatment.

TABLE 10

| | | Composition (Part by weight) | | | | | | | | | |
|---|---|---|---|---|---|---|---|---|---|---|---|
| | | PEO Mw: 500,000 | 28%- ammonia water | Aqueous resin*1) | | | | | | Process- ability | Persistency of hydrophilicity |
| | Substrate treatment | | | γ-PGA | PVA | CMC | $H_2ZrF_6$ | Acrylic monomer | Others PAA | | |
| Actual examples | | | | | | | | | | | |
| 45 | Coating-type chromating | 2 | 2 | — | 5 | — | — | 3 | 4 | good | excellent |
| 46 | Coating-type chromating | 4.5 | 2 | 4 | 5 | — | — | 3 | — | excellent | excellent |
| 47 | Coating-type chromating | 4.5 | 2.3 | 3 | — | 3 | 0.6 | 3 | 1.5 | excellent | excellent |
| 48 | Zirconic agent treating | 2 | 2 | — | 5 | — | — | 3 | 4 | good | excellent |
| 49 | Zirconic agent treating | 4.5 | 2 | 4 | 5 | — | — | 3 | — | excellent | excellent |
| 50 | Zirconic agent treating | 4.5 | 2.3 | 3 | — | 3 | 0.6 | 3 | 1.5 | excellent | excellent |
| 51 | Phenolic resin primer | 2 | 2 | — | 5 | — | — | 3 | 4 | good | good |
| 52 | Phenolic resin primer | 4.5 | 2 | 4 | 5 | — | — | 3 | — | excellent | good |
| 53 | Phenolic resin primer | 4.5 | 2.3 | 3 | — | 3 | 0.6 | 3 | 1.5 | excellent | good |
| Comparison examples | | | | | | | | | | | |
| 18 | Coating-type chromating | — | 2 | — | 5 | — | — | 3 | 4 | fair | fair |
| 19 | Coating-type chromating | — | 2 | 4 | 5 | — | — | 3 | — | poor | good |
| 20 | Coating-type chromating | — | 2.3 | 3 | — | 3 | — | 3 | 1.5 | poor | good |
| 21 | Zirconium agent treatment | — | 2 | — | 5 | — | — | 3 | 4 | fair | fair |
| 22 | Zirconium agent treatment | — | 2 | 4 | 5 | — | — | 3 | — | poor | good |
| 23 | Zirconium agent treatment | — | 2.3 | 3 | — | 3 | — | 3 | 1.5 | poor | good |
| 24 | Phenolic resin primer | — | 2 | — | 5 | — | — | 3 | 4 | fair | fair |

TABLE 10-continued

| | Substrate treatment | Composition (Part by weight) | | | | | | | | Process- ability | Persistency of hydrophilicity |
|---|---|---|---|---|---|---|---|---|---|---|---|
| | | PEO Mw: 500,000 | 28%- ammonia water | Aqueous resin[*1)] | | | | | | | |
| | | | | γ-PGA | PVA | CMC | $H_2ZrF_6$ | Acrylic monomer | Others PAA | | |
| 25 | Phenolic resin primer | — | 2 | 4 | 5 | — | — | 3 | — | poor | good |
| 26 | Phenolic resin primer | — | 2.3 | 3 | — | 3 | — | 3 | 1.5 | poor | good |

Note)
Mw: Weight-average molecular weight
[*1)]PEO: polyvinyl cellulose (Mw: 500,000) PVA: polyvinyl alcohol (Mw. 20,000), CMC: carboxymethyl cellulose (Mw: 20,000), acrylic monomer: N-methylol acrylamide, Δ-PGA: polyglutamic acid (Mw: 300,000), PAA: polyacrylic acid (Mw: 1,000,000)

Actual Examples 54 to 58

A zirconic surface treating aqueous solution (SURFAL-COAT 430A/430B manufactured by Nippon Paint Co., Ltd.) was applied to the aluminum plate after degreasing by a bar coat method, and then dried at 150° C. for 15 seconds, resulting in a formation of a Zr anticorrosion film of 5 mg/m$^2$.

Then, a hydrophilic surface treating aqueous solution containing polyethylene oxide(I), the sodium salt and ammonium salt of carboxymethyl cellulose(II), N-methylol acrylamide(II), and polyacrylic acid having the compositions shown in Table 11 was applied to the aluminum plate, and then dried at 200° C. for 30 seconds to form a hydrophilic film. The thickness of the hydrophilic film was 0.2 g/m$^2$. The above hydrophilic surface treating aqueous solution contained as a surfactant 5 parts by weight of sodium alkyldiphenylether disulfonate for 100 parts by weight of the above essential ingredients, and as a mildewproofing agent, 0.25 parts by weight of a benzimidazole compound and nitrogen-containing sulfur compound.

The thus obtained hydrophilic films were subjected to the following odor test, anti-water-solubility test, test for persistency of hydrophilicity, and anticorrosion test.

(1) Odor Test

Immediately after heating the aluminum plates on which the hydrophilic films had been individually formed (hereinafter referred to as samples) at 180° C. for three minutes, the odor test was performed by direct smelling. The evaluation criteria are as follows.

excellent: no odor
good: little odor
fair: clear odor
poor: strong odor (2) Anti-Water-Solubility Test The individual samples were immersed in the tap water for 24 hours to find the water solubility rate from the film amounts after and before immersion based on the following expression.

Water solubility rate=[(initial film amount—film amount after immersing for 24 hours)/initial film amount]×100.

The evaluation criteria for anti-water-solubility are as follows.

excellent: water solubility rate < 10%
good: 10% ≦ water solubility rate < 30%
fair: 30% ≦ water solubility rate < 50%
poor: 50% ≦ water solubility rate (3) Test for Persistency of Hydrophilicity After 20-times repetition of cycles in which each sample is subjected to flowing water for 17 hours (flow rate: 5 l/hour, tap water) and then dried at 80° C. for 7 hours, the contact angle Q of a droplet with respect to the dried hydrophilic film was measured.

Measurement of Droplet Contact Angle

The sample was laid horizontally and 5 μl of pure water dropped thereon to measure the contact angle by means of the goniometer. The evaluation criteria for the contact angle Q are as follows.

excellent: Q < 20°
good: 20° ≦ Q < 30°
fair: 30° ≦ Q < 40°
poor: 40° < Q (4) Anticorrosion Test (Salt Spray Test: SST)

Each sample was subjected to the salt spray test for 500 hours based on JIS-Z-2371 to thereafter evaluate the anticorrosion in terms of the ratio of the area where white rust occurred on the planar portion.

ratio of area where white rust occurred.

excellent: 0%
good: over 0%, and less than 10%
fair: not less than 10%, and less than 50%
poor: not less than 50%

The results are shown in Table 11.

Actual Example 59

The hydrophilic film was formed under the same conditions as in Actual example 54 and subjected to the same tests except that the content of Zr in the zirconium film formed by SURFALCOAT 430A/430B is 0,1 mg/m² and that the compositions of the hydrophilic surface treating agent are as shown in Table 11, The results are shown in Table 11.

Actual Example 60

The hydrophilic film was formed under the same conditions as in Actual example 59 and subjected to the same tests except that the content of Zr in the zirconium film formed by SURALCOAT 430A/430B is 40 mg/m².

Actual Examples 61 to 63

A Zr anticorrosion film whose Zr content is 2mg/m² was formed by SURFALCOAT 430A/430B in Actual example 59, and then subjected to the phosphoric chromating treatment by use of ALSURF 407/47 (manufactured by Nippon Paint Co., Ltd.) to thereby form chromating anticorrosion films whose contents of Cr are 3 mg/m² (Actual example 61), 20 mg/cm² (Actual example 62) and 50 mg/m² (Actual example 63), respectively. A hydrophilic film was formed thereon by the hydrophilic surface treating agent having the compositions shown in Table 11. The test results are similarly shown in Table 11.

Actual Examples 64 to 66

Without forming the Zr anticorrosion films by SURFALCOAT 430A/430B in Actual examples 61 to 63, phosphoric chromating films whose Cr contents are 3 mg/m² (Actual example 64), 20 mg/m² (Actual example 65), and 50 mg/m² (Actual example 66) were directly formed by use of ALSURF 407/47, upon which the hydrophilic film having the same composition as in the actual example 59 was formed. The test results are shown in Table 11.

Actual Examples 67 to 73

The anticorrosion film and hydrophilic film were similarly formed except that SURFALCOAT 427 was used as a coating-type chromating agent in lieu of ALSURF 407/47 in Actual examples 64 to 66 to thereby form chromating films whose Cr contents are 5 mg/m² (Actual example 67), 15 mg/m² (Actual example 68), and 30 mg/m² (actual example 69), respectively. Furthermore, in Actual examples 70 to 73 hydrophilic films were formed having the compositions shown in Table 11. The test results are shown in table 11.

Actual Examples 74 and 75

SURFALCOAT 450 (manufactured by Nippon Paint Co., Ltd.) was used as a phenolic resin primer so as to form primers whose thicknesses are 0.5 g/m² (Actual example 74) and 2.0 g/m² (Actual example 75), respectively. Afterwards, a hydrophilic film having a thickness of 0.2 g/m² was formed by use of the hydrophilic surface treating aqueous solution having the same composition as in the Actual example 59. Thus obtained hydrophilic film was subjected to the same tests as the above. The results are shown in Table 11.

TABLE 11

| Actual examples No. | CMC-Na[1] | CMC-NH$_4$[2] | N-MAM[3] | PAA[4] | PEO[5] |
|---|---|---|---|---|---|
| 54 | 5 | 25 | 70 | 2 | 25 |
| 55 | 12.5 | 37.5 | 50 | 25 | 25 |
| 56 | 25 | 50 | 25 | 25 | 25 |
| 57 | 5 | 50 | 45 | 25 | 25 |
| 58 | 25 | 25 | 50 | 25 | 25 |
| 59 | 12.5 | 37.5 | 50 | 25 | 25 |
| 60 | 12.5 | 37.5 | 50 | 25 | 25 |
| 61 | 12.5 | 37.5 | 50 | 25 | 25 |
| 62 | 12.5 | 37.5 | 50 | 25 | 25 |
| 63 | 12.5 | 37.5 | 50 | 25 | 25 |
| 64 | 12.5 | 37.5 | 50 | 25 | 25 |
| 65 | 12.5 | 37.5 | 50 | 25 | 25 |

| Actual examples No. | Odor | Performance Anti-water solubility | Persistency-of hydrophilicity | Anti-corrosion (SST) |
|---|---|---|---|---|
| 54 | excellent | excellent | good | good |
| 55 | excellent | excellent | excellent | good |
| 56 | excellent | good | excellent | good |
| 57 | excellent | excellent | good | good |
| 58 | good | excellent | excellent | good |
| 59 | excellent | excellent | excellent | good |
| 60 | excellent | excellent | good | good |
| 61 | excellent | excellent | excellent | excellent |
| 62 | excellent | excellent | excellent | excellent |
| 63 | excellent | excellent | good | excellent |
| 64 | excellent | excellent | excellent | good |
| 65 | excellent | excellent | excellent | good |

| Actual examples No. | CMC-Na[1] | CMC-NH$_4$[2] | N-MAM[3] | PAA[4] | PEO[5] |
|---|---|---|---|---|---|
| 66 | 12.5 | 37.5 | 50 | 25 | 25 |
| 67 | 12.5 | 37.5 | 50 | 25 | 25 |
| 68 | 12.5 | 37.5 | 50 | 25 | 25 |
| 69 | 12.5 | 37.5 | 50 | 25 | 25 |
| 70 | 12.5 | 37.5 | 50 | 5 | 10 |
| 71 | 12.5 | 37.5 | 50 | 10 | 5 |
| 72 | 12.3 | 37.5 | 50 | 25 | 50 |
| 73 | 12.5 | 37.5 | 50 | 50 | 25 |
| 74 | 12.5 | 37.5 | 50 | 25 | 25 |
| 75 | 12.5 | 37.5 | 50 | 25 | 25 |

| Actual examples No. | Odor | Performance Anti-water solubility | Persistency-of hydrophilicity | Anti-corrosion (SST) |
|---|---|---|---|---|
| 66 | excellent | excellent | good | good |
| 67 | excellent | excellent | excellent | good |
| 68 | excellent | excellent | excellent | good |
| 69 | excellent | excellent | good | good |
| 70 | excellent | excellent | good | good |
| 71 | excellent | excellent | good | good |
| 72 | excellent | good | excellent | good |
| 73 | excellent | good | excellent | good |
| 74 | excellent | excellent | excellent | excellent |
| 75 | excellent | excellent | excellent | excellent |

Actual Example 76

A hydrophilic film was formed similarly except that the sodium salt of carboxymethyl cellulose in Actual example 55 was substituted by the potassium salt. The thus obtained hydrophilic film was subjected to the same tests, with the result that odor, anti-water-solubility and water contact angle were all excellent and that the anticorrosion was good.

Comparison Examples 27 to 33

A zirconium anticorrosion film (Zr content: 5mg/m$^2$) was formed on the degreased aluminum plate by use of SURFALCOAT 4 30A/430B, on which a hydrophilic film was formed by the hydrophilic surface treating agent having the composition shown in Table 12. The thus obtained hydrophilic film on each sample was subjected to the same tests as in Actual example 54. The results are shown in Table 12.

TABLE 12

| Comparison examples No. | CMC-Na[(1)] | CMC-NH$_4$[(2)] | N-MAM[(3)] | PAA[(4)] | PEO[(5)] |
|---|---|---|---|---|---|
| 27 | 12.5 | 57.5 | 50 | 0 | 0 |
| 28 | 12.5 | 37.5 | 50 | 25 | 0 |
| 29 | 12.5 | 37.5 | 50 | 1 | 25 |
| 30 | 12.5 | 37.5 | 50 | 25 | 1 |
| 31 | 12.5 | 37.5 | 50 | 70 | 25 |
| 33 | 12.5 | 37.5 | 50 | 25 | 70 |
| 33 | 30 | 50 | 20 | 25 | 25 |

| Actual examples No. | Odor | Performance Anti-water solubility | Persistency of hydrophilicity | Anti-corrosion (SST) |
|---|---|---|---|---|
| 27 | fair | excellent | fair | good |
| 28 | good | fair | fair | good |
| 29 | good | poor | excellent | good |
| 30 | good | fair | good | good |
| 31 | excellent | fair | good | good |
| 33 | excellent | fair | excellent | good |
| 33 | fair | fair | excellent | good |

Actual Examples 77 to 86

A hydrophilic surface treating aqueous solution containing polyethylene oxide(I) sodium salt and the ammonium salt of carboxymethyl cellulose(II) N-methylol acrylamide(II), zirconium compound(II), and polyacrylic acid having the composition shown in Table 13,.was applied to the aluminum plate after degreasing by a bar-coat method, and then dried at 200° C. for 30 seconds to form a hydrophilic film. The thickness of the hydrophilic film was 0.2 g/m$^2$. The above hydrophilic surface treating aqueous solution contained as a surfactant 5 parts by weight of sodium alkyldiphenylether disulfonate for 100 parts by weight of the above essential ingredients, and as a mildewproofing agent 0.25 parts by weight of a benzimidazole compound and nitrogen-containing sulfur compound, with 25 ppm hydrofluoric acid in the treatment agent whose concentration was so prepared that the dried film weight was 0.2 g/m$^2$.

Thus obtained hydrophilic films were subjected to an (1) odor test, (2) anti-water-solubility test, (3) test for persistency of hydrophilicity, and (4) anticorrosion test in the same manner as in Actual example 54, and further to an alkali-resistance test.

(5) Alkali Resistance Test

Each sample was immersed in a degreasing liquid of SURFCLEANER 53 (manufactured by Nippon Paint Co., Ltd.) acting as an alkali cleaning agent under the following conditions and, after cleaning for 10 seconds by tap water, the film before and after immersion was observed and compared.

---
Cleaning Conditions concentration of SURFCLEANER 53: 3.0 wt % in water
immersion temperature: 70° C.
immersion time: 3 min.

---

The evaluation criteria for film external appearance are as follows.

---
excellent: no swelling
good: slight swelling
fair: swelling
poor: partially peeled off

---

The results are shown in Table 14.

Actual Example 87

A hydrophilic film was formed similarly except that the sodium salt of carboxymethyl cellulose in Actual example 77 was substituted the potassium salt. The thus obtained hydrophilic film was subjected to the same tests. The results are shown in Table 14.

Actual Example 88

A hydrophilic film was formed in the same manner as in Actual example 54 except that H$_2$ZrF$_6$ was substituted by (HF$_4$)$_3$ZrOH(CO$_3$)$_3$•2H$_2$O. Thus obtained hydrophilic film was subjected to the same tests. The results are shown in Table 14.

Actual Example 89 to 93

Phosphoric chromate films with a Cr content of 3 mg/m$^2$, 20 mg/m$^2$ and 50 mg/m$^2$ respectively were formed by use of ALSURF 407/47 on the aluminum plates which had been degreased in the same manner as Actual example 77. Upon it was formed a hydrophilic film having the composition shown in Table 13, The test results are shown in Table 14.

Actual Example 94 to 98

ALSURF 600 instead of ALSURF 407/47 in Actual examples 89 to 93 was used as a chromium chromate chemical conversion treating agent to form a chromate film with a Cr content of 20 mg/m$^2$, upon which was formed a hydrophilic film having the composition shown in Table 13, The test results are shown in Table 14.

Actual Example 99 to 102

SURFALCOAT 450 (manufactured by Nippon Paint Co,, Ltd.) as a phenolic resin primer was applied and baked on the aluminum plate which had been degreased in the same manner as Actual example 77 to thereby form primers having thicknesses of 0.5 g/m and 2.0 g/m$^2$ respectively. Then, a hydrophilic film with a thickness of 0.2 g/m$^2$ was formed by use of a hydrophilic surface treating agent having the composition shown in Table 13. The thus obtained hydrophilic film was subjected to the same tests as the above. The results are shown in Table 14.

TABLE 13

| Actual examples No. | Substrate treatment Type Film | properties* | CMC-Na[1] | CMC-Ka[6] | CMC-NH4[2] | N-MAM[3] |
|---|---|---|---|---|---|---|
| 77 | only degreasing | absent | 12.5 | — | 37.5 | 50 |
| 78 | only degreasing | absent | 12.5 | — | 37.5 | 50 |
| 79 | only degreasing | absent | 12.5 | — | 37.5 | 50 |
| 80 | only degreasing | absent | 12.5 | — | 37.5 | 50 |
| 81 | only degreasing | absent | 12.5 | — | 37.5 | 50 |
| 82 | only degreasing | absent | 5 | — | 25 | 70 |
| 83 | only degreasing | absent | 5 | — | 25 | 70 |
| 84 | only degreasing | absent | 25 | — | 50 | 25 |
| 85 | only degreasing | absent | 5 | — | 50 | 45 |
| 86 | only degreasing | absent | 25 | — | 25 | 50 |
| 87 | only degreasing | absent | — | 12.5 | 37.5 | 50 |
| 88 | only degreasing | absent | 12.5 | — | 37.5 | 50 |
| 89 | A** | 3 | 12.5 | — | 37.5 | 50 |
| 90 | A | 20 | 12.5 | — | 37.5 | 50 |
| 91 | A | 50 | 12.5 | — | 37.5 | 50 |
| 92 | A | 20 | — | 12.5 | 37.5 | 50 |
| 93 | A | 20 | 12.5 | — | 37.5 | 50 |
| 94 | B*** | 20 | 12.5 | — | 37.5 | 50 |
| 95 | B | 20 | 12.5 | — | 37.5 | 50 |
| 96 | B | 20 | 12.5 | — | 37.5 | 50 |
| 97 | B | 20 | — | 12.5 | 37.5 | 50 |
| 98 | B | 20 | 12.5 | — | 37.5 | 50 |
| 99 | S**** | 500 | 12.5 | — | 37.5 | 50 |
| 100 | S | 2000 | 12.5 | — | 37.5 | 50 |
| 101 | S | 500 | — | 12.5 | 37.5 | 50 |
| 102 | S | 500 | 12.5 | 12.5 | 37.5 | 50 |

| Actual example No. | PEO[5] | PEO(7) | PAA[4] | $H_2ZrF_6$[8] | $(NH_4)_3ZrOH(CO_3) \cdot 2H_2O$[9] |
|---|---|---|---|---|---|
| 77 | 25 | 0 | 25 | 2.2 | — |
| 78 | 25 | 0 | 25 | 8.8 | — |
| 79 | 25 | 0 | 25 | 0.88 | — |
| 80 | 0 | 25 | 25 | 0.88 | — |
| 81 | 0 | 25 | 25 | 8.8 | — |
| 82 | 25 | 0 | 25 | 0.88 | — |
| 83 | 25 | 0 | 25 | 0.8 | — |
| 84 | 25 | 0 | 25 | 0.88 | — |
| 85 | 25 | 0 | 25 | 0.88 | — |
| 86 | 25 | 0 | 25 | 2.2 | — |
| 87 | 25 | 0 | 25 | 2.2 | — |
| 88 | 25 | 0 | 25 | — | 2.2 |
| 89 | 25 | 0 | 25 | 2.2 | — |
| 90 | 25 | 0 | 25 | 2.2 | — |
| 91 | 25 | 0 | 25 | 2.2 | — |
| 92 | 25 | 0 | 25 | 2.2 | — |
| 93 | 25 | 0 | 25 | — | 2.2 |
| 94 | 10 | 0 | 50 | 2.2 | — |
| 95 | 15 | 0 | 0 | 2.2 | — |
| 96 | 50 | 0 | 25 | 2.2 | — |
| 97 | 25 | 0 | 50 | 2.2 | — |
| 98 | 25 | 0 | 25 | — | 2.2 |
| 99 | 25 | 0 | 25 | 2.2 | — |
| 100 | 25 | 0 | 25 | 2.2 | — |
| 101 | 25 | 0 | 25 | 2.2 | — |
| 102 | 25 | 0 | 25 | — | 2.2 |

Note)
(1) sodium salt of carboxymethyl cellulose (APP84, manufactured by Nippon Paper Ind. Co., Ltd.)
(2) ammonium salt of carboxymethyl cellulose (DN-10L, manufactured by Daicel Chemical Industries, Ltd.)

(3) N-methylol acrylamide (N-MAM P, manufactured by Soken Chemical & Engineering Co., Ltd.)
(4) polyacrylic acid (AC-10L, manufactured by Nippon Jyunyaku Co., Ltd.)
(5) polyethylene oxide (PEO-1, weight-average molecular weight: 150,000 to 400,000, manufactured by Sumitomo Seika Chemicals Co., Ltd.)
(6) potassium salt of carboxymethyl cellulose (manufactured by Daicel Chemical Industries. Ltd., prepared to be pH6 by neutralizing acid type CMC with KOH)
(7) polyethylene oxide (PEO-3, weight-average molecular weight: 600,000 to 1,100,000, manufactured by Sumitomo Seika Chemicals Co., Ltd.)
(8) $H_2ZrF_6$ (manufactured by Morita Kagaku Kogyo Co., Ltd., the content being represented as Zr)
(9) zirconium ammonium carbonate (ZIRCOSOL, manufactured by Dai-ichi Rare Metal Chemical Ind. Co., Ltd.)
*: coating weight (mg/m$^2$)
**: A is ALSURF 407/47(phosphoric chromate series)

TABLE 13-continued

\*\*\*: B is ALSURF 600 (chromium chromate series)
\*\*\*\*: S is SURFALCOAT 450 (phenolic resin primer)

TABLE 14

| Actual examples No. | Odor | Performance | | | |
|---|---|---|---|---|---|
| | | Anti-water-solubility | Persistency-of hydrophilicity | Anticorrosion (SST) | Alkali resistance |
| 77 | excellent | excellent | excellent | good | excellent |
| 78 | excellent | excellent | excellent | good | good |
| 79 | excellent | excellent | excellent | good | good |
| 80 | excellent | excellent | excellent | good | good |
| 81 | excellent | excellent | excellent | good | excellent |
| 82 | excellent | excellent | good | good | good |
| 83 | excellent | excellent | good | good | excellent |
| 84 | good | good | excellent | good | good |
| 85 | excellent | excellent | excellent | good | good |
| 86 | excellent | excellent | good | good | excellent |
| 87 | excellent | excellent | excellent | good | excellent |
| 88 | excellent | excellent | excellent | good | excellent |
| 89 | excellent | excellent | excellent | good | excellent |
| 90 | excellent | excellent | excellent | excellent | excellent |
| 91 | excellent | excellent | good | excellent | excellent |
| 92 | excellent | excellent | excellent | excellent | excellent |
| 93 | excellent | excellent | excellent | excellent | excellent |
| 94 | excellent | excellent | excellent | excellent | excellent |
| 95 | excellent | excellent | good | excellent | excellent |
| 96 | excellent | good | excellent | excellent | excellent |
| 97 | excellent | good | excellent | excellent | excellent |
| 98 | excellent | excellent | excellent | excellent | excellent |
| 99 | excellent | excellent | excellent | excellent | excellent |
| 100 | excellent | excellent | excellent | excellent | excellent |
| 101 | excellent | excellent | excellent | excellent | excellent |
| 102 | excellent | excellent | excellent | excellent | excellent |

Comparison Examples 34 to 39

A hydrophilic film was formed on the aluminum plate which had been degreased in the same manner as Actual example 77 by a hydrophilic surface treating agent having the composition shown in Table 15. Thus obtained hydrophilic film on each sample was subjected to the same tests as in Actual example 77. The results are shown in Table 16.

TABLE 15

| Comparison example No. | Substrate treatment | CMC-Na[1] | CMC-NH4[2] | N-MAM[3] |
|---|---|---|---|---|
| 34 | only degreasing | 12.5 | 37.5 | 50 |
| 35 | only degreasing | 12.5 | 37.5 | 50 |
| 36 | only degreasing | 12.5 | 37.5 | 50 |
| 37 | only degreasing | 12.5 | 37.5 | 50 |
| 38 | only degreasing | 12.5 | 37.5 | 50 |
| 39 | only degreasing | 12.5 | 37.5 | 50 |

| Comparison example No. | PEO[5] | PAA[4] | $H_2ZrF_6$ [8] |
|---|---|---|---|
| 34 | 0 | 0 | 2.2 |
| 35 | 25 | 0 | 2.2 |
| 36 | 0 | 25 | 2.2 |
| 37 | 25 | 1 | 2.2 |
| 38 | 1 | 25 | 2.2 |
| 39 | 70 | 25 | 2.2 |

TABLE 16

| Comparison examples No. | Odor | Performance | | | |
|---|---|---|---|---|---|
| | | Anti-water-solubility | Persistency-of hydrophilicity | Anticorrosion (SST) | Alkali resistance |
| 34 | fair | excellent | fair | good | excellent |
| 35 | good | poor | excellent | good | excellent |
| 36 | good | fair | fair | good | excellent |
| 37 | good | poor | excellent | good | excellent |
| 38 | good | fair | fair | good | excellent |
| 39 | excellent | fair | excellent | good | excellent |

From these results, the present invention provides a hydrophilic surface treating aqueous solution, hydrophilic surface treating method, and hydrophilic surface treating film ensuring a smaller contact angle of a water droplet and superior persistency of hydrophilicity even after the repetition of 20 warming cycles. Also, the friction coefficient was low, and the processability was good.

The surface treating aqueous solution, surface treating method and surface treating film in accordance with the present invention are applicable not only to the fins of the heat exchanger but also to anything which requires condensation-proof and antistatic properties. Applications requiring the condensation-proof properties are glass or plastics for use in automobiles, electrical control equipment, watches, and the inner surfaces of other instrument panels, aiming at improving the visibility (anti-fogging treatment). The condensation-proof properties are also required for the inner walls of houses, window glass, or food containers for juice, beer and so on. In the case of improving the efficiency of utilization of sunlight, the present invention is effective in preventing the condensation in a vinyl house.

On the other hand, an application requiring the anti-static properties is, for example, in electronic equipment in which the surface treating aqueous solution, surface treating method, and surface treating film of the present invention having characteristics of stronger polarity and higher hydrophilicity can be used for the antistatic treatment.

The surface treating aqueous solution, surface treating method and surface treating film of the present invention are also useful for improving lubrication. For example, the present invention is applicable to the lubricating treatment for improving the lubrication and processability of aluminum or other metallic plates.

According to the hydrophilic surface treating aqueous solution, hydrophilic surface treating method and hydrophilic surface treating film of the present invention, as described above, there can be obtained a hydrophilic film having a good persistency of the hydrophilicity and processability. The odor is also remarkably suppressed. The resultant aqueous polymer presents an extremely high crystallizability, in particular, due to the structure of the polyoxyalkylene chain within the aqueous polymer having the weight-average molecular weight of 10,000 to 2,000,000 and containing polyoxyalkylene chain of 10 wt % or more in terms of solid content. This results in a good processability in a forming step. Furthermore, the alkaline oxide within this aqueous polymer ensures a higher hydrophilicity of the film. The aqueous polymer having the weight-average molecular weight of 10,000 to 2,000,000 and containing a polyoxyalkylene chain of 10 wt % or over in terms of solid content readily forms a complex compound in conjunction with at least one aqueous resin selected from the group (a) to (l) to (k) and the aqueous inorganic crosslinking agent thereby heighten the persistency of hydrophilicity after the film formation. The conformation of the polyoxyalkylene chain results in a structure allowing the formation of the complex compound in conjunction with various compounds due to hydrogen bonding.

What is claimed is:

1. A hydrophilic surface treating aqueous solution comprising:

(I) a polyethylene oxide or ethylene oxide/propylene oxide copolymer containing polyoxyalkylene chain in an amount of 10 wt % or more in terms of solid content and having a weight-average molecular weight of 10,000 to 2,000,000 in an amount of 10–78 parts by weight;

(II) at least one resin selected from the group consisting of polyvinyl alcohol, polyvinyl pyrrolidone and carboxyl methylcellulose in an amount of 10–78 parts by weight;

(III) 10–70 parts by weight of N-methylol acrylamide; and at least one member selected from the group consisting of homopolymers of acrylic acid or methacrylic acid and copolymers of acrylic acid or methacrylic acid comprising at least one of said acids, in an amount of 2–70 parts by weight.

2. The hydrophilic surface treating aqueous solution according to claim 1, wherein the polyoxyalkylene chain of said aqueous polymer (I) is 10 parts or more by weight with respect to a total 100 parts by weight in solid content of components consisting of said components (I), (II), (III) and (IV).

3. The hydrophilic surface treating aqueous solution according to claim 1, wherein said polyethylene or ethylene oxide/propylene oxide copolymer (I) has a weight-average molecular weight of 20,000 to 1,000,000.

4. The hydrophilic surface treating aqueous solution according to claim 1, wherein said component (I) is polyethylene oxide.

5. The hydrophilic surface treating aqueous solution according to claim 1, wherein said component (IV) is polyacrylic acid.

6. The hydrophilic surface treating aqueous solution according to claim 1, further containing at least one inorganic crosslinking agent selected from the group consisting of a chromium, titanium, aluminum, zinc, and zirconium compound.

7. The hydrophilic surface treating aqueous solution according to claim 6, wherein said inorganic Crosslinking agent is $H_2ZrF_6$.

8. The hydrophilic surface treating aqueous solution according to claim 1, wherein said hydrophilic surface treating aqueous solution contains in terms of solid content 5 to 50 parts by weight of said polyethylene oxide or ethylene oxide/propylene oxide copolymer (I) and 5–50 parts by weight of polyacrylic acid, with respect to a total of 100 parts by weight of components consisting of:

(i) 5 to 25 parts by weight of the sodium salt and/or potassium salt of carboxymethyl cellulose;

(ii) 25 to 50 parts by weight of the ammonium salt of carboxymethyl cellulose; and (iii) 25 to 70 parts by weight of N-methylol acrylamide.

9. The hydrophilic surface treating aqueous solution according to claim 6, wherein said hydrophilic surface treating aqueous solution contains in terms of solid content of 5 to 50 parts by weight of said polyethylene oxide or ethylene oxide/propylene oxide copolymer (I), 5 to 50 parts by weight of polyacrylic acid and 0.6 to 9 parts by weight of zirconium compound (as Zr), with respect to a total of 100 parts of components consisting of:

(i) 5 to 25 parts by weight of the sodium salt and/or potassium salt of carboxymethyl cellulose;

(ii) 25 to 50 parts by weight of the ammonium salt of carboxymethyl cellulose; and (iii) 25 to 70 parts by weight of N-methylol acrylamide.

* * * * *